US012677726B2

(12) United States Patent
Harmon

(10) Patent No.: US 12,677,726 B2
(45) Date of Patent: Jul. 14, 2026

(54) CAMERA BASED FLOW DETECTION

(71) Applicant: DEERE & COMPANY, Moline, IL (US)

(72) Inventor: Andrew W. Harmon, Davenport, IA (US)

(73) Assignee: Deere & Company, Moline, IL (US)

( * ) Notice: Subject to any disclaimer, the term of this patent is extended or adjusted under 35 U.S.C. 154(b) by 884 days.

(21) Appl. No.: 17/155,806

(22) Filed: Jan. 22, 2021

(65) Prior Publication Data

US 2022/0232754 A1 Jul. 28, 2022

(51) Int. Cl.
| | |
|---|---|
| *A01C 7/10* | (2006.01) |
| *A01C 17/00* | (2006.01) |
| *G01F 1/7086* | (2022.01) |
| *G01F 1/86* | (2006.01) |

(52) U.S. Cl.
CPC ............ *A01C 7/102* (2013.01); *A01C 17/006* (2013.01); *G01F 1/7086* (2013.01); *G01F 1/86* (2013.01)

(58) Field of Classification Search
CPC ......... A01C 7/042; A01C 7/102; A01C 7/105; A01C 17/006
See application file for complete search history.

(56) References Cited

U.S. PATENT DOCUMENTS

| | | | | |
|---|---|---|---|---|
| 4,239,128 A | * | 12/1980 | Longnecker | ............ G01P 3/488 |
| | | | | 222/626 |
| 4,307,390 A | * | 12/1981 | Steffen | .................. G06M 1/101 |
| | | | | 250/222.2 |

| | | | | |
|---|---|---|---|---|
| 5,927,217 A | * | 7/1999 | Halford | .................. A01C 7/081 |
| | | | | 111/174 |
| 9,976,881 B2 | * | 5/2018 | Gervais | ..................... G01F 1/06 |
| 2007/0266917 A1 | * | 11/2007 | Riewerts | ............... A01C 7/105 |
| | | | | 111/200 |
| 2011/0054743 A1 | * | 3/2011 | Kocer | ...................... A01C 7/06 |
| | | | | 701/50 |
| 2015/0223391 A1 | * | 8/2015 | Wendte | .................... A01C 7/04 |
| | | | | 111/177 |
| 2016/0161306 A1 | * | 6/2016 | Gervais | .................... G06T 7/62 |
| | | | | 73/861.73 |

(Continued)

FOREIGN PATENT DOCUMENTS

| | | | | |
|---|---|---|---|---|
| CA | 2747523 A1 | * | 2/2012 | ............. A01C 7/081 |
| DE | 102015114146 A1 | | 3/2017 | |

(Continued)

OTHER PUBLICATIONS

Extended European Search Report and Written Opinion issued in European Patent Application No. 22152213.9, dated Jun. 22, 2022, in 09 pages.

(Continued)

*Primary Examiner* — Jamie L McGowan
(74) *Attorney, Agent, or Firm* — Taft Stettinius & Hollister LLP; Stephen F. Rost

(57) ABSTRACT

A method for identifying a flow of commodity through a commodity distribution system. The method including providing a tank configured to contain a commodity, selectively distributing commodity from the tank to a drill assembly to be distributed to an underlying surface, and monitoring the flow of commodity from the tank to the drill assembly with a camera to identify flow characteristics.

20 Claims, 17 Drawing Sheets

(56) References Cited

U.S. PATENT DOCUMENTS

| | | | | |
|---|---|---|---|---|
| 2020/0077573 A1* | 3/2020 | Gervais | ................. | A01C 7/102 |
| 2020/0229342 A1* | 7/2020 | Stöcklin | ................. | A01C 15/04 |
| 2021/0243939 A1* | 8/2021 | Strnad | ..................... | A01C 7/04 |
| 2022/0240442 A1* | 8/2022 | Hubner | .................... | G01F 1/36 |

FOREIGN PATENT DOCUMENTS

| | | |
|---|---|---|
| EP | 2417846 A1 | 2/2012 |
| WO | WO2017204716 A1 | 11/2017 |

OTHER PUBLICATIONS http://www.picomixer.com/STA.html, "Vehicle Counter & Road Traffic Analyzer Software," publicly available before Jan. 22, 2021, 6 pages.

* cited by examiner

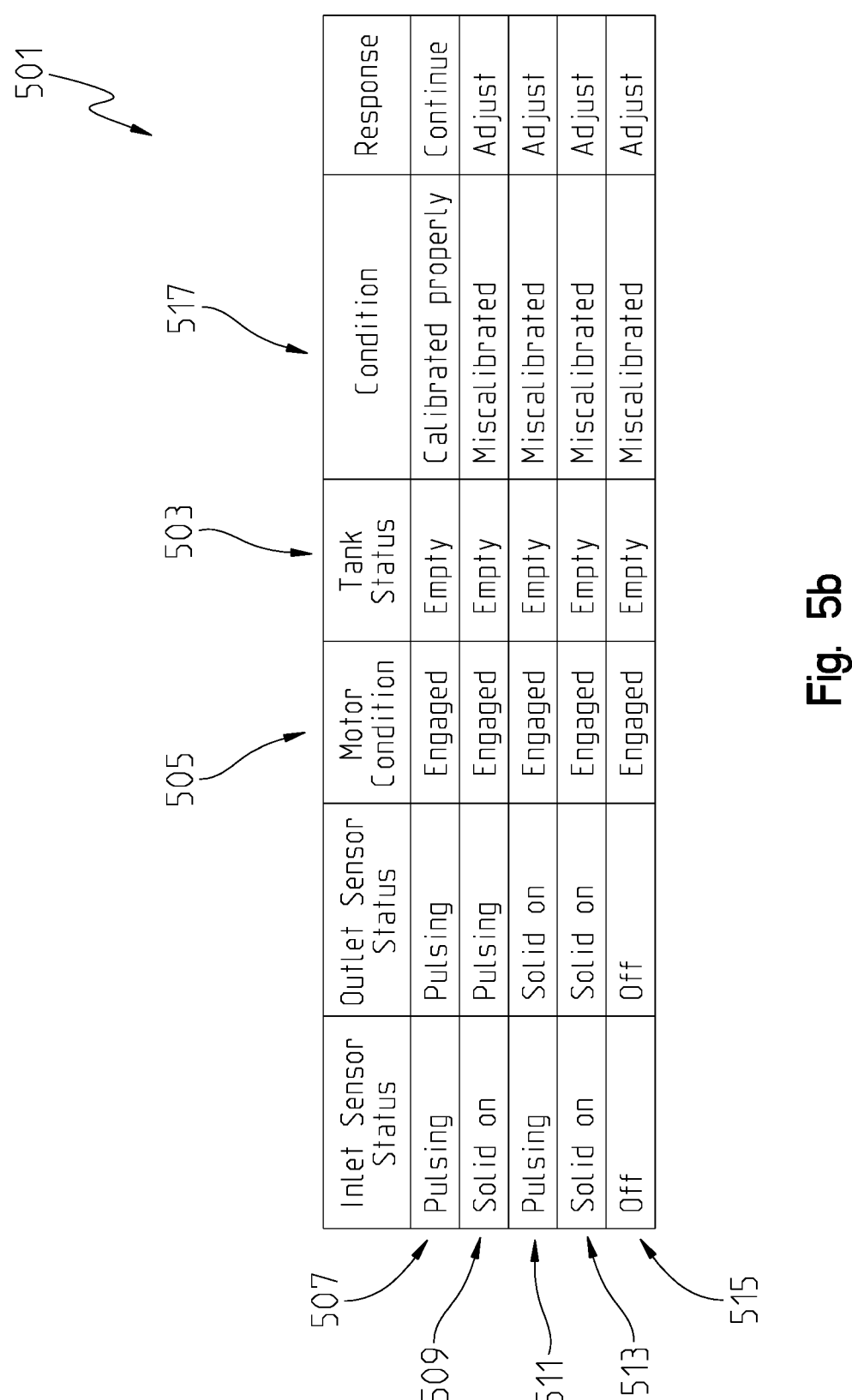

| Inlet Sensor Status | Outlet Sensor Status | Motor Condition | Tank Status | Condition | Response |
|---|---|---|---|---|---|
| Pulsing | Pulsing | Engaged | Empty | Calibrated properly | Continue |
| Solid on | Pulsing | Engaged | Empty | Miscalibrated | Adjust |
| Pulsing | Solid on | Engaged | Empty | Miscalibrated | Adjust |
| Solid on | Solid on | Engaged | Empty | Miscalibrated | Adjust |
| Off | Off | Engaged | Empty | Miscalibrated | Adjust |

Fig. 5b

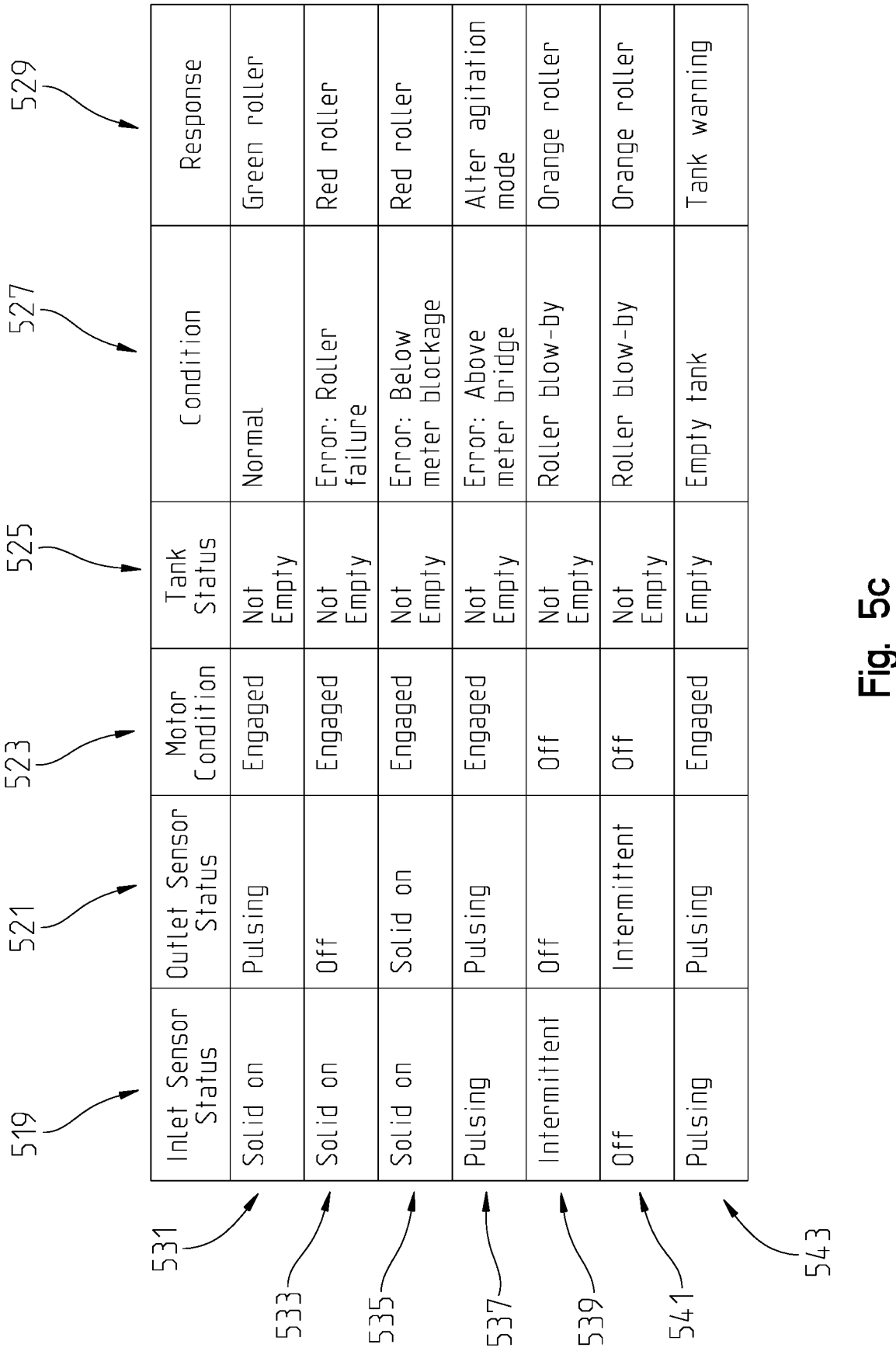

| Inlet Sensor Status 519 | Outlet Sensor Status 521 | Motor Condition 523 | Tank Status 525 | Condition 527 | Response 529 |
|---|---|---|---|---|---|
| Solid on | Pulsing | Engaged | Not Empty | Normal | Green roller |
| Solid on | Off | Engaged | Not Empty | Error: Roller failure | Red roller |
| Solid on | Solid on | Engaged | Not Empty | Error: Below meter blockage | Red roller |
| Pulsing | Pulsing | Engaged | Not Empty | Error: Above meter bridge | Alter agitation mode |
| Intermittent | Off | Off | Not Empty | Roller blow-by | Orange roller |
| Off | Intermittent | Off | Not Empty | Roller blow-by | Orange roller |
| Pulsing | Pulsing | Engaged | Empty | Empty tank | Tank warning |

CAMERA BASED FLOW DETECTION

FIELD OF THE DISCLOSURE

The present disclosure relates generally to identifying the flow of commodity from a cart to a tool and more specifically to identifying commodity flow performance with one or more camera.

BACKGROUND

Modern air seeders utilize airflow through conduit to direct commodity such as fertilizer and seed to a desired location. Typically, the commodity is stored in a tank on a cart and selectively provided to conduits to be further transported to a drill assembly or otherwise ultimately placed in the underlying soil. A meter assembly is often positioned between the tank and the conduit to selectively distribute commodity from the tank into the conduit.

SUMMARY

One embodiment is a method for identifying a flow of commodity through a commodity distribution system. The method including providing a tank configured to contain a commodity, selectively distributing commodity from the tank to a drill assembly to be distributed to an underlying surface, and monitoring the flow of commodity from the tank to the drill assembly with a camera to identify flow characteristics.

In one example of the embodiment, the identified flow characteristics are a commodity type. In another example, the flow characteristics include identifying a blockage in commodity between the tank and the drill assembly. In yet another example, the camera is positioned to identify a roller type of a meter assembly. In a further example the flow characteristics include a roller speed. In yet another example, the camera is positioned to identify the flow of commodity after passing through a meter assembly and before a secondary splitter. In one example, the camera is positioned at a meter assembly to identify the flow of commodity through the meter assembly.

In yet another example, the camera is positioned at a secondary splitter. As part of this example, the camera identifies the flow of commodity to a plurality of runs.

In another example, the flow characteristics include identifying the commodity flow rate.

Another embodiment is an air seeding system that has a tank configured to at least partially contain a commodity, a meter assembly configured to selectively distribute commodity from the tank to one or more run, a drill assembly configured to direct the commodity provided by the one or more run to an underlying surface, a camera positioned along a flow path between the meter assembly and the drill assembly, and a controller in communication with the camera. The controller analyzes data provided by the camera to determine flow characteristics of commodity along at least a portion of the flow path.

In one example of this embodiment, the camera is positioned to provide image data at an output of the meter assembly. In part of this example, the camera is positioned to identify a roller type. In another part of this example, the camera is positioned to identify a roller speed.

In another example of this embodiment, the camera is positioned between the meter assembly and a secondary splitter to identify the flow of commodity after passing through the meter assembly but before the secondary splitter. In yet another example, the camera is positioned at a tower head and is configured to identify the flow of commodity into a plurality of secondary runs.

Yet another embodiment is a method for identifying the flow of commodity through a system. The method includes providing a fluid path between a tank and a drill, positioning a camera to view material moving along the fluid path, communicating image data from the camera to a controller, and analyzing the data with the controller to identify the flow characteristics of commodity moving along the fluid path.

One example of this embodiment includes comparing the flow characteristics with a threshold to identify a blockage. In part of this example, the controller provides a warning when a blockage is identified.

Another example of this embodiment includes providing the image data to a user interface to be viewed by a user.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein:

FIG. 4b is a logic flowchart for a response for the flowchart of FIG. 4a;

FIG. 5b is a chart identifying a calibration condition;

FIG. 5c is a chart identifying commodity flow conditions;

Corresponding reference numerals are used to indicate corresponding parts throughout the several views.

DETAILED DESCRIPTION

Figure 1:
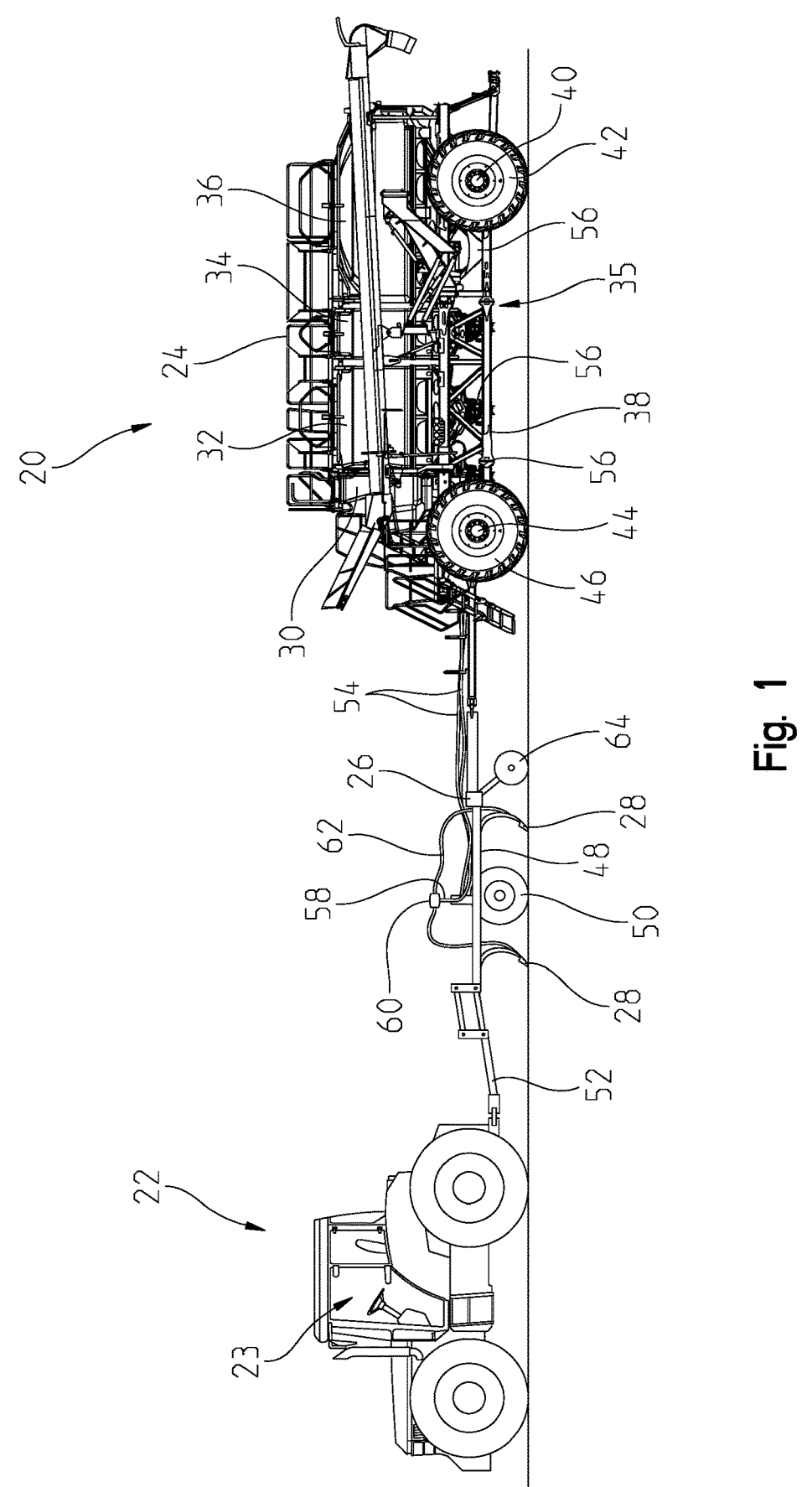
FIG. 1 is a side view of a towed cart and prime mover along with an attached implement.

For the purposes of promoting an understanding of the principles of the present disclosure, reference will now be made to the embodiments described herein and illustrated in the drawings and specific language will be used to describe the same. It will nevertheless be understood that no limitation of the scope of the present disclosure is thereby intended, such alterations and further modifications in the illustrated devices and methods, and such further applications of the principles of the present disclosure as illustrated therein being contemplated as would normally occur to one skilled in the art to which the present disclosure relates.

An air or pneumatic seeder 20 is shown in FIG. 1 towed by a tractor or prime mover 22. The seeder 20 includes an air cart 24, also known as a commodity cart, having one or more tanks for one or more commodities to be applied to the soil, and a drill or implement 26 which applies the commodity to the soil. The drill has a plurality of ground engaging tools 28. The cart 24 is shown with four tanks 30, 32, 34, and 36 mounted on a frame 38. The frame 38 is supported on a rear axle 40 having wheels/tires 42 at the rear of the frame 38. Depending on the cart configuration, additional axles may be provided, such as front axle 44 and wheels/tires 46. The axles and wheels support the cart frame 38 for movement over the ground surface towed by tractor 22. Any number of tanks can be provided on the air cart. The term "cart" should be broadly construed to include any device towed by a prime mover that is supported on one or more axles, such as a trailer, wagon, cart, implement, etc.

The drill 26 includes a frame 48 supported by ground wheels 50 and is connected to the rear of the tractor 22 by a tongue 52. As shown, the cart 24 is known as a "tow behind" cart meaning that the cart follows the drill. In alternative arrangements, the cart may be a "tow between" cart meaning that the cart is between the tractor 22 and drill 26. In yet a further possible arrangement, the air cart and drill can be combined onto a common frame. The tanks 30, 32, 34, and 36 can be any suitable device for holding a material or commodity such as seed or fertilizer to be distributed to the soil. The tanks could be hoppers, bins, boxes, containers, etc. The term "tank" shall be broadly construed herein. Furthermore, one tank with multiple compartments can also be provided.

A pneumatic distribution system 35 includes a fan located behind the front tires 46, connected to a product delivery conduit structure having multiple product flow passages 54. The fan directs air through the passages 54. A product meter assembly 56 is located at the bottom of each tank and delivers product from the tanks at a controlled rate to the passages 54 and the air stream moving through the passages 54.

Each passage 54 carries product in the air stream to a secondary splitter or secondary distribution tower 58 on the drill 26. The secondary splitter may be any separation in the flow path of a passage 54. Typically, there will be one tower 58 for each passage 54. Each tower 58 includes a secondary distributing manifold 60 located at the top of a vertical tube. Each passage 54 may transition to the vertical tube of the tower 58 through a J-shaped tube 66 wherein the passage 54 transitions from a substantially horizontal path of travel to a substantially vertical path of travel before entering the distributing manifold 60. The distributing manifold 60 divides the flow of product into a number of secondary distribution lines 62. Each secondary distribution line 62 delivers product to one of a plurality of ground engaging tools 28 which opens a furrow in the soil and deposits the product therein. The number of passages 54 may vary from one to eight, nine, or ten or more, depending on the configuration of the cart and drill. Depending on the cart and drill, there may be two distribution manifolds in the air stream between the meters and the ground engaging tools. Alternatively, in some configurations, the product is metered directly from the tank into secondary distribution lines 62 leading to the ground engaging tools 28 without an intermediate distribution manifold.

A firming or closing wheel 64 associated with each tool 28 trails the tool and firms the soil over the product deposited in the soil. Various types of tools 28 may be used including, tines, shanks, disks, etc. The tools 28 are movable between a lowered position engaging the ground and a raised position above the ground. Each tool may be configured to be raised by a separate actuator. Alternatively, multiple tools 28 may be mounted to a common rockshaft for movement together. In yet another alternative, the tools 28 may be fixed to the frame 38 and the frame 38 raised and lowered by linkages on each of the drill wheels 50.

Figure 2:
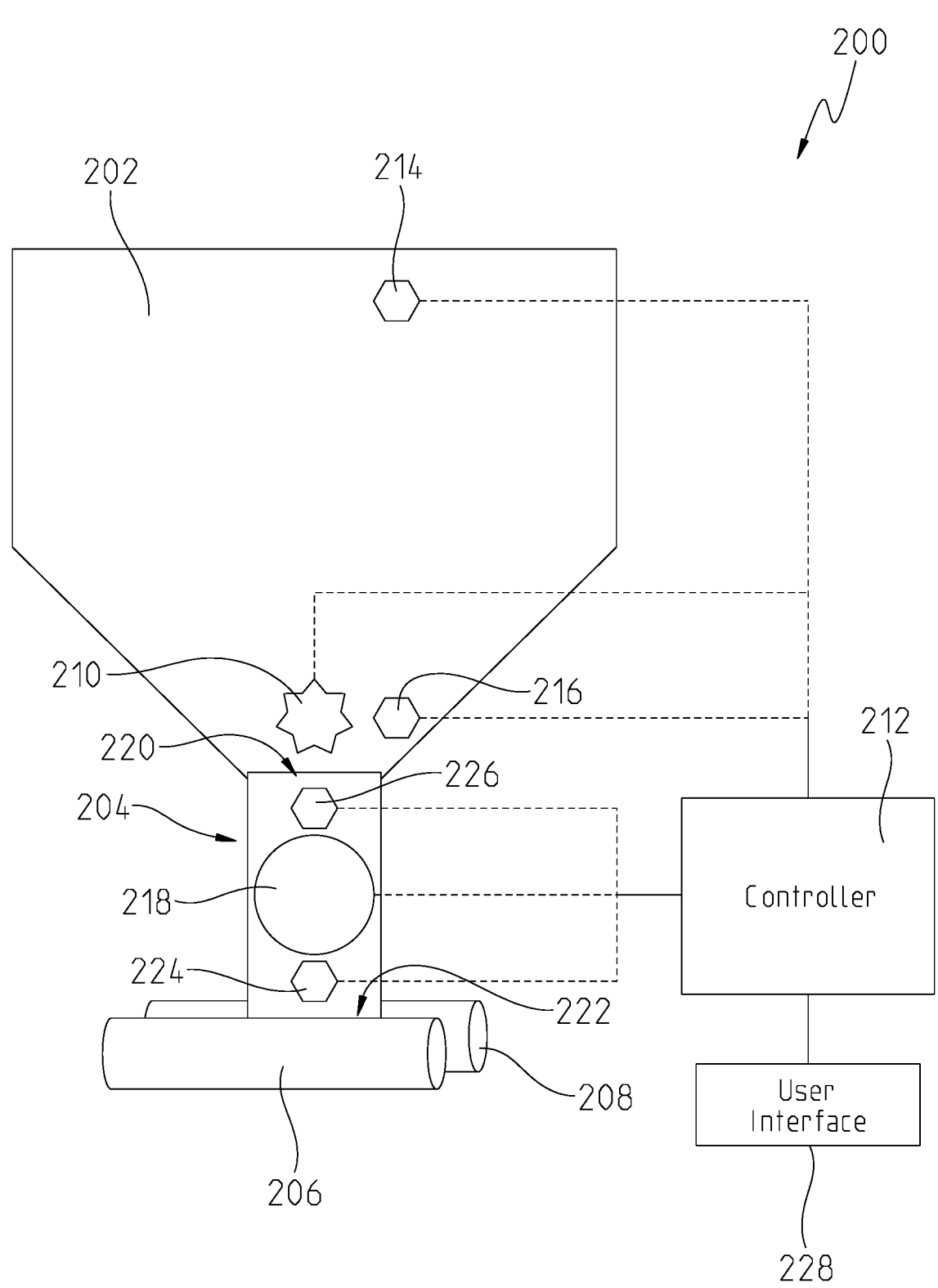
FIG. 2 is a schematic view of a meter assembly.

Referring now to the non-exclusive embodiment of FIG. 2, a schematic view of a meter assembly 200 is illustrated. The meter assembly 200 may have a reservoir or tank 202 coupled to a meter 204. The tank 202 may be any of the tanks 30, 32, 34, and 36 and be sized to contain commodity therein and direct the commodity to the meter 204. Commodity may refer to seed, fertilizer, or other nutrients and the like that promote growing a crop. The meter 204 may be representative of the product meter assembly 56. Further, the meter 204 may selectively distribute commodity from the tank 202 to a first or second passage 206, 208. Passages 206, 208 may be representative of passages 54 of FIG. 1. In one aspect of this disclosure, the meter 204 may have a run selector, flapper, or the like that is selectively repositionable to distribute commodity from the tank 202 into either one of the first passage 206 or the second passage 208 depending on the position of the flapper.

While two passages 206, 208 are illustrated herein, this disclosure contemplates embodiments with more than two passages coupled to the meter 204. Further still, there may be only one passage coupled to the meter 204. As will be understood in view of this disclosure, the teachings discussed herein are applicable to meters having any number of passages coupled thereto.

In one aspect of this disclosure, the tank 202 may have an agitator 210 positioned in or on the tank 202. The agitator 210 may be a rotary agitator having extensions that extend radially away from a rotation axis. The agitator 210 may interact with the tank 202 to agitate any commodity therein to ensure the commodity is properly fed into the meter 204. While a rotary agitator is discussed herein, this disclosure contemplates any known commodity agitator for the agitator 210. In one aspect of this disclosure, the agitator 210 may be selectively engaged by a controller 212 to agitate any commodity in the tank 202.

The amount or presence of commodity in the tank 202 may be identified through one or more sensor as well. In one non-exclusive example, a tank fill height sensor 214 may be positioned to identify the fill height of any commodity in the tank 202. The sensor 214 may be an ultrasonic sensor, a camera, or any other sensor that can identify the presence of commodity in the tank 202. Further, in one embodiment of this disclosure the sensor 214 may be a camera that is configured to identify the type of commodity in the tank 202.

In another non-exclusive example, the tank 202 may have a tank load sensor 216 positioned to identify the weight of the tank 202 along with any commodity positioned therein. The sensor 216 may be a load sensor or the like positioned between the tank 202 and the cart frame 38 or portion thereof to identify the weight of the tank 202 and commodity therein. In this configuration, the sensor 216 may communicate readings to the controller 212 that are indicative of the weight of commodity in the tank 202. In one aspect of this disclosure, the weight of the tank 202 may be a value stored in a memory unit of the controller 212 or elsewhere. The weight of the tank 202 may be compared to the readings from the sensor 216 to identify when the tank is empty. For example, when the sensor 216 identifies a reading to the controller 212 that is about equal to the weight of the tank 202, the controller 212 may identify that the tank 202 is substantially empty and does not contain a significant amount of commodity.

In one aspect of this disclosure, the meter 204 may have a roller 218 positioned therein. The roller 218 may selectively distribute commodity from an inlet 220 to an outlet 222. The roller 218 may rotate about an axis and have a plurality of cavities 604 (see FIG. 6) spaced circumferentially there about. Each of the plurality of cavities 604 may have a radially distal opening that allows commodity to enter and exit each of the plurality of cavities 604 as the roller 218 rotates. Accordingly, commodity positioned at the inlet 220 may fall by gravity into one of the cavities 604 of the roller 218 as it rotates thereby. Next, as that roller cavity 604 rotates about the axis towards the outlet 222, the commodity may fall out of the cavity 604 as gravity and radial forces move the commodity towards the outlet 222. Accordingly, the commodity may be distributed in a metered fashion from the inlet 220 to the outlet 222 based on the rotation speed of the roller 218.

In one aspect of this disclosure, the rotational speed of the roller 218 may be dictated by the controller 212. More specifically, the roller 218 may be coupled to a motor or the like. In one non-limiting example the motor is an electrical motor that is controlled by the controller 212 to rotate the roller 218. However, the motor may be a pneumatic or hydraulic motor as well that is controlled through the controller 212 via a corresponding electro-hydraulic or electro-pneumatic system. Accordingly, this disclosure contemplates implementing the teachings discussed herein to control a roller 218 with the controller 212 utilizing an electrical, electro-hydraulic, or electro-pneumatic system.

In another aspect of this disclosure, the outlet 222 may have an outlet sensor 224 positioned to identify a blockage of commodity in the outlet 222. More specifically, the outlet sensor 224 may be positioned between the roller 218 and the passages 206, 208. The sensor 224 may communicate with the controller 212 to identify when a blockage of commodity is present in the outlet 222. In one aspect of this disclosure, the readings of the sensor 224 may be used to identify the source of a commodity blockage in the seeder 20. More specifically, the sensor 224 may identify when commodity is not passing through the meter 204 to allow the controller 212 to respond as discussed herein.

In one embodiment of this disclosure, the sensor 224 may be a camera that provides visual feedback to the controller 212 to identify the state of commodity moving from the roller 218 to the corresponding passage 206, 208. The camera sensor 224 may be oriented to view commodity as it exits the roller 218 at the outlet 222. In one embodiment, the camera sensor 224 is further oriented to at least partially view the roller 218 and provide data to the controller 212 regarding the roller 218 such as identifying the type of roller 218, the rotation speed of the roller 218, wear, and any other information that may be visually identifiable.

In one embodiment of this disclosure, an inlet sensor 226 may be positioned along the inlet 220 of the meter 218. The sensor 226 may communicate with the controller 212 to identify when commodity is not present at the inlet 220. More specifically, when the tank 202 is properly filled with commodity, and that commodity is properly flowing through the inlet 220, the sensor 226 may communicate to the controller 212 that commodity is present. However, when the tank 202 is empty or when the commodity jams above the inlet 220, the sensor 226 may communicate to the controller that there is not commodity present at the inlet 220 and therefore the meter 204 is not distributing commodity into the passages 206, 208. In one embodiment of this disclosure, the inlet sensor 226 is also a camera configured to identify the state of the roller 218 and commodity at the inlet 220

The controller 212 may also communicate with a user interface 228. The user interface 228 may provide a location for a user to input data or commands to the controller 212 as well as allow the controller 212 to provide an indicator to the user. In one non-exclusive example of this disclosure, the user interface 228 may be a touch screen device. The touch screen device may have a plurality of user-selectable inputs displayed thereon that allow the user to communicate an input preference to the controller 212. In another embodiment, the user interface 228 may be buttons and switches among other things positioned on a dash and selectable by a user. In yet another embodiment, the user interface 228 may rely on visual or auditory input from the user to indicate user preference.

Similarly, the user interface 228 may provide an indicator to the user regarding actions and observations of the controller 212. More specifically, the user interface 228 may be a display that shows icons representing the conditions of the seeder 20 identified by the controller 212 via communication with the sensors 214, 216, 224, 226, agitator 210, and roller 218. In one non-limiting example, the user interface 228 may show an icon when the roller 218 is being powered. Further, the user interface 228 may show an icon when the agitator 210 is engaged. Further still, the user interface 228 may show an icon when blockage is identified by the outlet sensor 224 or when no commodity is identified by the inlet sensor 226 among other things. The indication presented by the user interface 228 may also be a light that is illuminated, an auditory signal played to the user, haptic feedback that is felt by the user, or any other type of indication that may be observable by a user. Further, in one non-exclusive example the user interface 228 is a remote device such as a tablet, computer, or smartphone.

In one embodiment, the user interface 228 may provide footage of any camera sensors positioned within the meter assembly 200. More specifically, the user interface may show live views of the outlet 222 when sensor 224 is a camera. Additionally, the user interface may also show live view of the inlet 220 when the sensor 226 is a camera. Further still, the user interface 228 may show a side-by-side view of the inlet 220 and the outlet 222 when both sensors 226, 224 are cameras.

Figure 3:
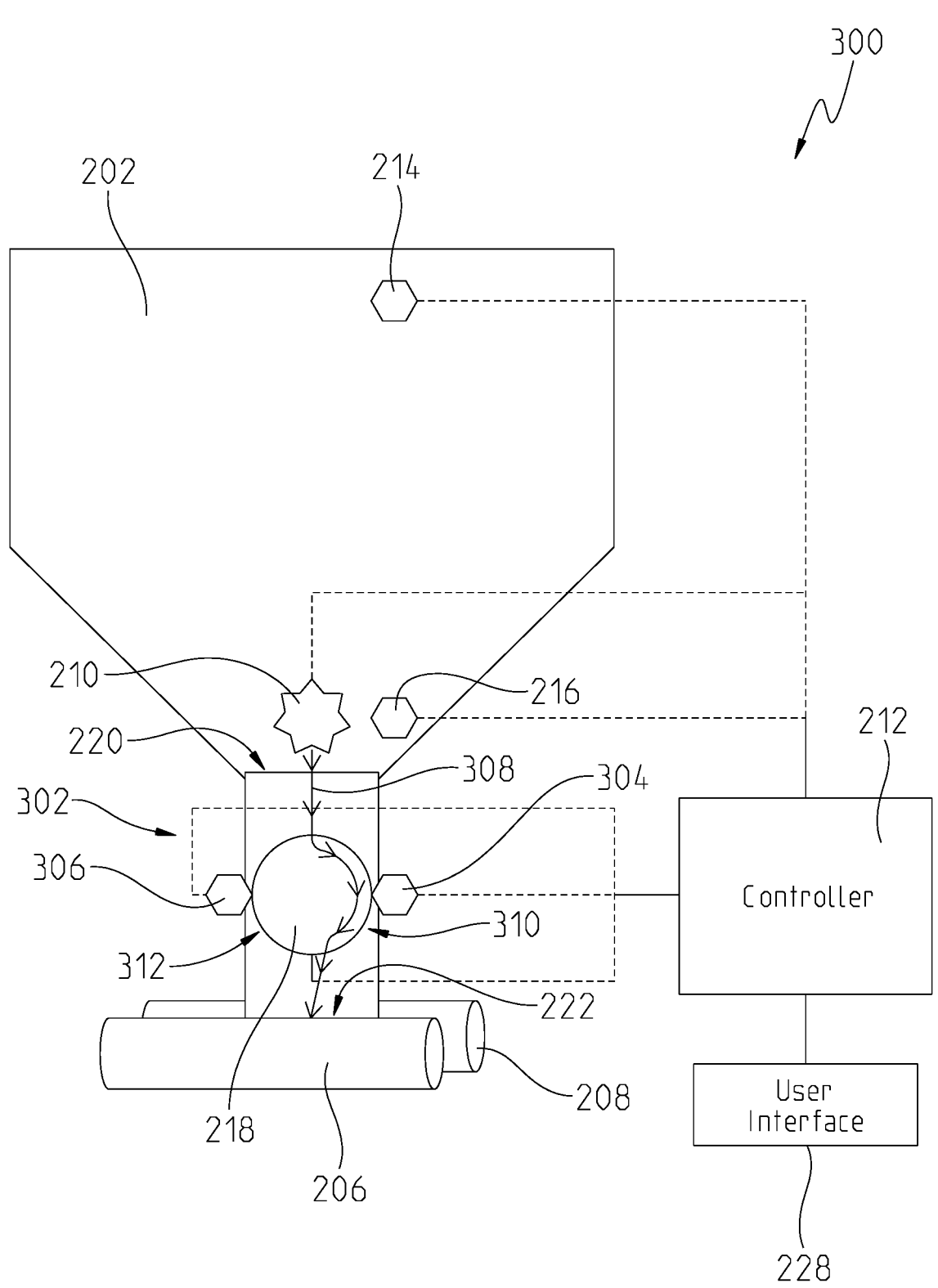
FIG. 3 is a schematic view of another embodiment of a meter assembly.

Referring now to FIG. 3, another embodiment of a meter assembly 300 is illustrated. The meter assembly 300 of FIG. 3 may be similar to the meter assembly 200 of FIG. 2 with like components identified with like reference numbers. More specifically, the meter assembly 300 may have a tank 202 with sensors 214, 216 and an agitator 210 that communicate with a controller 212. However, a meter 302 of FIG. 3 may position an inlet sensor 304 and an outlet sensor 306 about the roller 218 rather than at the inlet 220 and outlet 222 as illustrated in FIG. 2. More specifically, the meter 302 may be designed to process commodity with the roller 218 along a commodity path 308. The commodity path may be the typical path of the commodity as the roller 218 rotates to transfer commodity from the tank 202 to the passages 206, 208. More specifically, the flow path 308 may transfer commodity through a processing side 310 of the meter 302 wherein the cavities of the roller 218 are expected to have commodity therein as the roller 218 rotates. Further, the meter 302 may also have an exhausted side 312 wherein the cavities of the roller 218 will typically be void of commodity under proper operating conditions.

As discussed herein, the roller 218 may have a plurality of cavities 604 defined there around to transfer commodity from the inlet 220 to the outlet 222. In this configuration, the cavities 604 on the side of the roller 218 moving from the inlet 220 to the outlet 222 may be at least partially filled with commodity. As the cavities 604 of the roller 218 pass the outlet 222, any commodity therein is typically dispersed out of the outlet 222. As the roller 218 continues to rotate past the outlet 222, the cavities 604 moving from the outlet 222 back to the inlet 220 are typically substantially void of commodity. In this configuration, the sensors 304, 306 may communicate with the controller 212 to identify when commodity is properly being transferred through the meter 302, when commodity is not entering the meter 302, and when commodity is blocked at the outlet 222 among other things. The sensors 304, 306 may be cameras that view the roller 218 through a lens or other clear covering allowing the camera sensors 304, 306 to visually identify the presence of commodity in the cavities 604 of the roller 218 along with other characteristics such as roller type and rotation speed among other things.

In one aspect of the embodiment of FIG. 3, the controller 212 may monitor the sensors 304, 306 along with the roller 218 to ensure that commodity is moving as expected through the meter 302. More specifically, if the controller 212 identifies the roller 218 should be moving, the controller 212 may check the inlet sensor 304 to identify whether commodity is present in the cavities 604 of the roller 218. If the inlet sensor 304 identifies to the controller 212 that commodity is not present, the controller 212 may send an indication that commodity is not present and execute additional functions to determine cause. The additional functions may include one or more of check sensors 214, 216 to determine whether commodity is in the tank 202, engage the agitator 210, and check the roller 218 condition among other things.

If commodity is identified by the inlet sensor 304, the controller 212 may check the outlet sensor 306 to ensure the commodity is properly leaving the outlet 222 and entering one or more of the passages 206, 208. More specifically, if commodity is properly entering at least one of the passages 206, 208, the outlet sensor 306 may indicate to the controller 212 that the cavities 604 of the roller 218 are substantially void of commodity. However, if there is a blockage at the outlet 222 or the like, commodity may remain in the cavities 604 of the roller 218 as it rotates and the outlet sensor 306 may indicate the same to the controller 212. If a blockage is identified by the controller 212 through the outlet sensor 306, the controller 212 may send an indication of the condition to the user via the user interface 228 or the like.

While controller 212 is used throughout, the teachings of this disclosure may be implemented by any one or more controller of the seeder 20 or tractor 22. More specifically, the controller 212 can be any controller or combination of controllers capable of communicating with one or more of the sensors 214, 216, 224, 226, 304, 306, agitator 210, and roller 218. Further, the controller 212 may contain or otherwise have access to a processor for executing commands and a memory unit for storing algorithms, charts, measured values, sensor readings, threshold values, or any other data or the like. Further still, in one example of this embodiment the controller 212 is at least partially located remotely from the seeder 20 and data is communicated wirelessly thereto. Accordingly, while a single controller 212 is illustrated, this disclosure contemplates using any known control device or combination of control devices to implement the logic and teachings discussed herein.

In another aspect of this disclosure, the controller 212 may communicate with the sensors 214, 216, 224, 226, 304, 306, agitator 210, and roller 218 through any known form of communication or combination thereof. More specifically, in one embodiment the controller 212 may communicate through wires of a wire harness or the like that electrically couple the sensors 214, 216, 224, 226, 304, 306, agitator 210, and roller 218 to the controller 212. As one non-exclusive example, communication with the controller 212 may be executed through a Controller Area Network or "CAN bus." Alternatively, the controller 212 may communicate with the sensors 214, 216, 224, 226, 304, 306, agitator 210, and roller 218 wirelessly via any known wireless protocol. In this embodiment, the controller 212 may send and receive information from the corresponding components without being physically electrically coupled thereto via wires or the like. Regardless the form with which the controller 212 sends and receives information, the controller 212 may communicate with one or more of the sensors 214, 216, 224, 226, 304, 306 to identify present conditions and instruct responses from one or more of the agitator 210, roller 218, and user interface 228 among other things.

The sensors 224, 226, 304, 306 may be any type of sensor able to identify commodity in the corresponding meter 204, 302. In one non-exclusive example, the sensors 224, 226, 304, 306 may be proximity sensor that can identify the presence of commodity through a portion of the corresponding meter 204, 302. However, this disclosure contemplates utilizing any type of sensor capable of identifying such a condition.

Figure 4A:
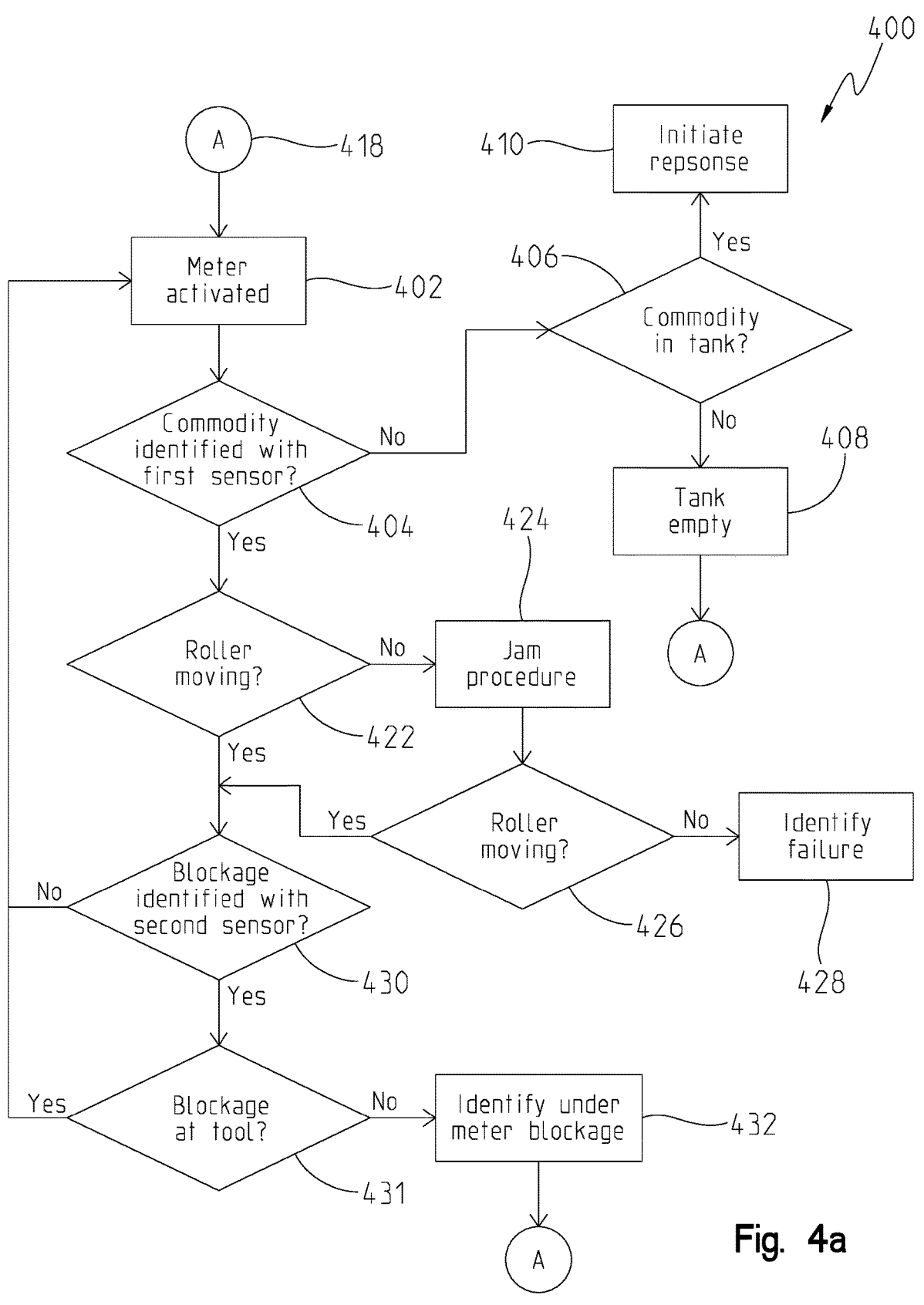
FIG. 4a is a logic flowchart for one embodiment of this disclosure.

Referring now to FIG. 4a, one non-exclusive example of a meter flow logic 400 is illustrated. The meter flow logic 400 may be implemented by controller 212 utilizing the configurations discussed herein or by any other controller or combination of controllers of the tractor 22, seeder 20, or other device. Initially in box 402, the controller 212 may consider whether the meter 204 or 302 is activated. In one non-exclusive example, the controller 212 may consider signals sent to the roller 218 to determine whether the meter is activated in box 402. In other examples, the controller 212 may consider whether a motor powering the roller 218 is powered as part of box 402. In yet another embodiment, the controller 212 may consider image data received from one or more camera sensor 224, 226, 304, 306 to identify movement of the roller 218. In other words, box 402 may generally consider whether the roller 218 of the corresponding meter should be rotating and thereby processing commodity there through.

If the meter is not activated in box 402, the logic may end and continue to monitor the meter to identify when it is activated. However, if the meter is identified as activated in box 402, the controller 212 may then monitor a first sensor in box 404 to identify whether commodity is going into the meter. In one non-exclusive example, the first sensor may be the inlet sensor 226. In another example, the inlet sensor may be inlet sensor 304. Further still, the first sensor of box 404 may be any sensor that is capable of identifying the presence of commodity in the meter. In the embodiment wherein the inlet sensor 226, 304 is a camera, box 404 may analyze video produced by the sensor 226, 304 to determine whether commodity is provided to the roller 218.

If commodity is not identified in box 404, the controller 212 may consider whether there is commodity in the corresponding tank in box 406. For example, the tank may be tank 202 and the controller 212 may utilize one or more of the tank fill height sensor 214 or the tank load sensor 216 to determine whether there is commodity in the tank 202 in box 406. If the tank fill height sensor 214 indicates the tank 202 is empty, the controller may execute box 408. Further, the controller 212 may identify the tank 202 as empty when the tank load sensor 216 identifies the weight of the tank 202 to correspond to an empty tank. Further, the controller 212 may implement any other sensor or the like to check for the presence of commodity in the tank 202 in box 406.

If the tank 202 is determined empty in box 406, the controller implements box 408. In other words, box 408 is implemented when the first sensor of box 404 does not identify commodity in the meter and tank sensors 214, 216 don't identify commodity in the tank 202. In box 408, the controller 212 may determine that the first sensor of box 404 did not identify commodity because there was not any commodity present in the tank 202. In one aspect of box 408, the controller 212 may utilize the user interface 228 or the like to identify the empty condition.

Alternatively, if commodity is identified in the tank in box 406, the controller 212 may conclude that a jam of commodity is restricting flow into the meter and initiate a response in box 410. Box 410 may be initiated when the first sensor of box 404 is not identifying commodity in the meter but commodity is identified in the tank in box 406. In other words, box 410 is initiated when commodity is in the tank 202 but otherwise prevented from entering the meter assembly.

The response of box 410 may be providing an indication that the controller 212 identified a jam. In one non-exclusive example, the indication of a jam from box 410 may be implemented with the user interface 228. For example, the indication may be an icon on a display showing the jam. Further, the indication may be an auditory signal or haptic feedback.

Figure 4B:
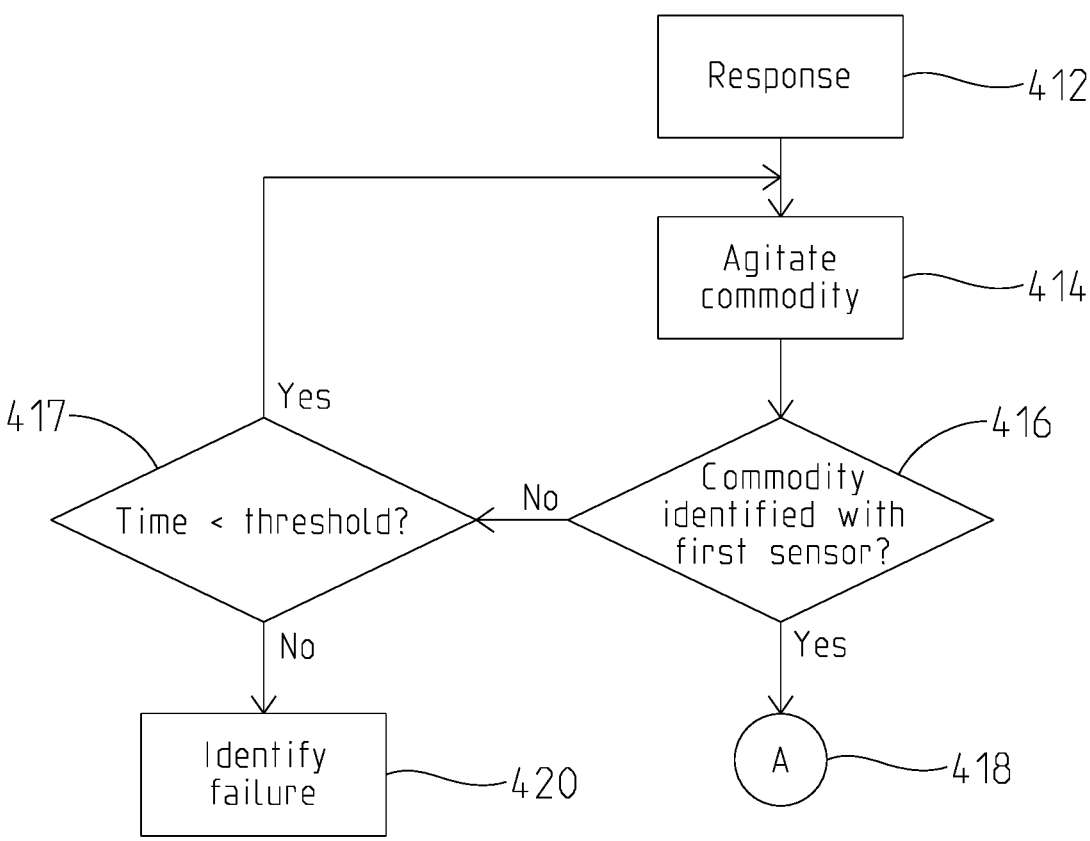

In addition to, or instead of, showing an indication, the controller 212 may initiate a response sequence starting with box 412 (see FIG. 4b) after, or instead of, box 410. The response sequence may include agitating the commodity in the tank 202 in box 414. More specifically, the controller 212 may engage the agitator 210 in box 414 to break loose the blocked commodity. In the embodiment where the agitator 210 is a rotating member, box 414 may include altering the rotation speed or pattern of the agitator 210. Alternatively, the controller 212 may alter the agitator 210 in any way that may break the blockage of commodity to flow into the meter assembly.

After or during the agitation step of box 414, the controller 212 may monitor the first sensor to identify when commodity is provided to the meter in box 416. More specifically, if the blockage of commodity is broken in box 414, commodity will enter the meter and the first sensor will identify the presence of commodity in the meter in box 416. If commodity is identified in box 416, the controller 212 may identify that the blockage is addressed and re-run the logic 400 from the start 418.

However, if commodity is not identified by the first sensor in box 416, the controller 212 may identify that the blockage is still present and continue to agitate the commodity in box 414 for a preset amount of time in box 417. Box 417 may be a preset time threshold wherein the controller 212 continues to agitate the commodity in the tank 202 in an attempt to break loose the blockage. However, if the blockage is not broken loose after the preset time threshold, the controller 212 may identify that the agitation step of box 414 is not affecting the blockage. After the time threshold is met, the controller 212 may execute box 420 and identify the failure to break loose the blockage of commodity.

The controller 212 may identify the failure of box 420 utilizing the user interface 228 or any of the methods discussed herein for indicating a condition is present. More specifically, the controller 212 may display that the commodity remains blocked from the meter in box 420. Further, auditory, visual, or haptic signals may be utilized in box 420 to identify the failure. Further still, the controller 212 may show live images on the user interface 228 of the blocked area when one or more of the sensors 214, 226 comprise a camera.

Referring back to box 404, the controller 212 may execute box 422 if commodity is identified by the first sensor in box 404. In box 422, the controller 212 may identify whether the roller 218 is moving. More specifically, the controller 422 may identify signals sent to a motor or the like intended to power the roller 218 to identify whether the roller 218 should be moving. In one non-exclusive example, the controller 212 may monitor the power provided to an electric motor that powers the roller 218. If the power provided thereto is above a threshold, the controller 212 may determine that the roller 218 is not moving and execute a jam procedure of box 424. In another embodiment wherein at least one of the sensors 224, 226, 304, 306 is a camera oriented at least partially towards the roller 218, the controller 212 may analyze visual data to determine whether the roller is moving in box 422.

The jam procedure of box 424 may include reversing the rotation direction of the roller 218 temporarily to clear any jams between the roller 218 and the meter housing. After the roller 218 is temporarily reversed in box 424, the controller 212 may engage the roller 218 to rotate in the normal operating direction. Then, in box 426, the controller 212 may again check whether the roller 218 is moving as described for box 422. If the roller 218 is still not moving in box 426. The controller 212 may identify the failure in box 428. More specifically, in box 428 the controller 212 may utilize the user interface 228 or any of the indication methods discussed herein to identify that the roller 218 is not rotating as expected. Further, in the embodiment utilizing a camera as one of the sensors 224, 226, 304, 306 the controller 212 may use the user interface 228 to display an image of the roller 218.

If the roller 218 was identified as moving properly in either box 422 or box 426, the controller 212 may execute box 430 and monitor a second sensor of the meter. The second sensor of box 430 may be the outlet sensor 224 or the outlet sensor 306. Further still, the second sensor of box 430 may be any sensor capable of identifying a blockage of commodity at the outlet of a meter. In one aspect of this disclosure, commodity is intended to flow from the roller 218 and into one or more of the corresponding passages 206, 208. Under normal operating conditions, the commodity briefly passes by the second sensor as it enters one of the passages 206, 208. However, when a blockage of commodity occurs at or in the outlet of the meter, the commodity will remain stationary at the second sensor. In one aspect of this disclosure, the second sensor of box 430 is able to communicate to the controller 212 when the commodity is not properly flowing into one or more of the passages 206, 208.

If a blockage is not identified by the second sensor in box 430, the meter assembly is functioning as expected and the controller 212 may return to box 402 to repeatedly execute the logic 400. However, if a blockage is identified in box 430, the controller 212 may implement box 431 and check other vehicle systems for a blockage at the tool 28. More specifically, one or more sensor may be positioned along the distribution tower 58 or along any portion of the tool 28 that can identify a blockage at the tool 28. At box 431, the controller 212 checks whether there is a blockage at the tool area which could cause the blockage identified at the meter 204, 302. More specifically, if commodity is not properly leaving the tool 28, the blockage of commodity could fill the corresponding passages 54 and cause the blockage identified in box 430.

When the controller 212 identifies a blockage at the tool in box 431, the controller 212 may allow any tool blockage systems to address or warn of the blockage at the tool and return to box 402 to monitor the meter assembly. However, if the controller 212 does not identify a blockage at the tool in box 431, the controller may identify that the blockage at the meter assembly is not caused by a backup from a blockage at the tool. According, the controller 212 may execute box 432 when there is not commodity blockage at the tool in box 431. Alternatively, other embodiments of this disclosure may not consider whether there is a blockage at the tool at all and box 431 may be omitted.

In box 432, the controller may utilize the user interface 228 to identify the under meter blockage. More specifically, the controller 212 may utilize a display screen to show an icon illustrating the blockage or providing a textual warning about the blockage at the meter. Further still, any other visual or auditory signal may be expressed via the controller 212 to identify the blockage of box 430. In yet another example, the controller 212 may utilize haptic feedback to identify the blockage. Further still, in one aspect of box 430 the controller 212 may send an indication of the blockage to a remote device such as a computer, smartphone, tablet, or the like. In embodiments utilizing a camera as a sensor, the indication may include a photo or video clip of the blockage. Accordingly, the controller 212 may utilize many different indicators or combination of indicators to identify the blockage in box 430.

After box 432, the controller 212 may continue to execute the logic 400 discussed herein. Further, the controller 212 may substantially continuously monitor and execute the boxes discussed herein for the logic 400. In one non-exclusive example, the controller 212 may repeatedly execute the logic boxes at a rate appropriate to timely identify a blockage of commodity when present.

In one aspect of this disclosure, having two sensors allows the controller 212 to identify whether the meter is both being supplied commodity and passing the commodity to the corresponding passage 206, 208 properly. More specifically, the first sensor of box 404 must identify the presence of commodity at the inlet of the meter to ensure the roller is moving commodity there through. Then, the second sensor of box 430 must not identify a blockage of commodity to thereby ensure that commodity is both flowing into the meter and being effectively delivered to the corresponding passage 206, 208.

In one embodiment of this disclosure there may not be a box 404 and related at all. In this embodiment, the controller 212 may transition from box 402 directly to box 422. Further, the controller 212 may primarily monitor the second sensor in box 430 to ensure there is not a blockage of commodity at the outlet of the meter. In one aspect of this embodiment, the controller 212 may rely on one or more of the tank fill height sensor 214 and the tank load sensor 216 to identify whether commodity is in the tank 202. If commodity is in the tank 202, the controller 212 may assume commodity is present at the inlet of the meter and only monitor the outlet with the second sensor of box 430 to identify a blockage.

Figure 4C:
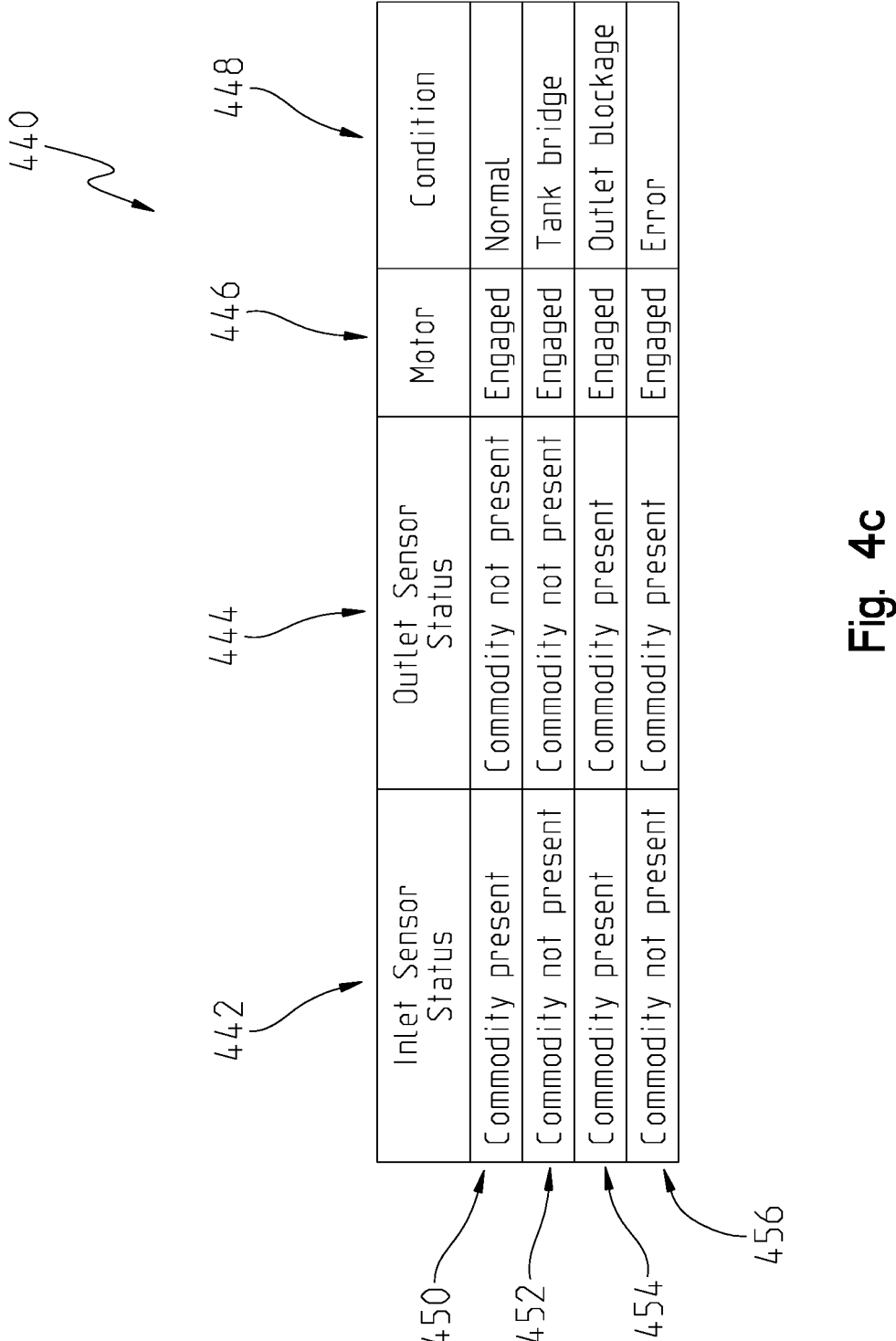
FIG. 4c is a logic chart for one embodiment of this disclosure.

Referring now to FIG. 4c, a logic chart 440 is illustrated. The logic chart 440 may be stored in the memory unit of the controller 212 and referenced by the controller 212 to implement the logic 400. More specifically, the potential sensor readings are identified in the first and second columns 442, 444 and the roller motor engagement and identified condition are listed in the third and fourth columns 446, 448. A first row 450 may indicate a normal scenario wherein the meter assembly is processing commodity as expected. More specifically, in the first row commodity is identified by the inlet sensor in column 442. Further, the outlet sensor may indicate a clear condition wherein no blockage of commodity is present in the second column 244. In this scenario, when the motor is engaged the meter assembly may be assumed to be functioning as intended.

A second row 452 may illustrate a tank bridge condition in column 448. The tank bridge condition may be identified when both the inlet sensor and the outlet sensor do not detect commodity and the roller motor is engaged. In this scenario, the controller 212 may further check one or more of the tank height and load sensors 214, 216 to confirm that commodity is present in the tank 202 as discussed herein. If commodity is in the tank but not identified by either the inlet sensor or the outlet sensor, the controller 212 may conclude that there is a tank bridge and respond accordingly.

In row 454, a meter outlet blockage may be the identified condition in column 448. The meter outlet blockage condition may be identified when both the inlet sensor and the outlet sensor identify the presence of commodity. As discussed herein, under proper operating conditions commodity should flow out of the outlet 222 and into one or more of the passages 206, 208. Accordingly, when the outlet sensor identifies commodity as in row 454 an outlet blockage condition may be present.

Lastly, in row 456 an error condition may be identified in column 448. The error condition may be determined when the inlet sensor is not identifying commodity but the outlet sensor is. Under normal operating conditions, this scenario should not occur and the controller 212 may indicate an error when the sensors indicate the readings of row 456.

Figure 5A:
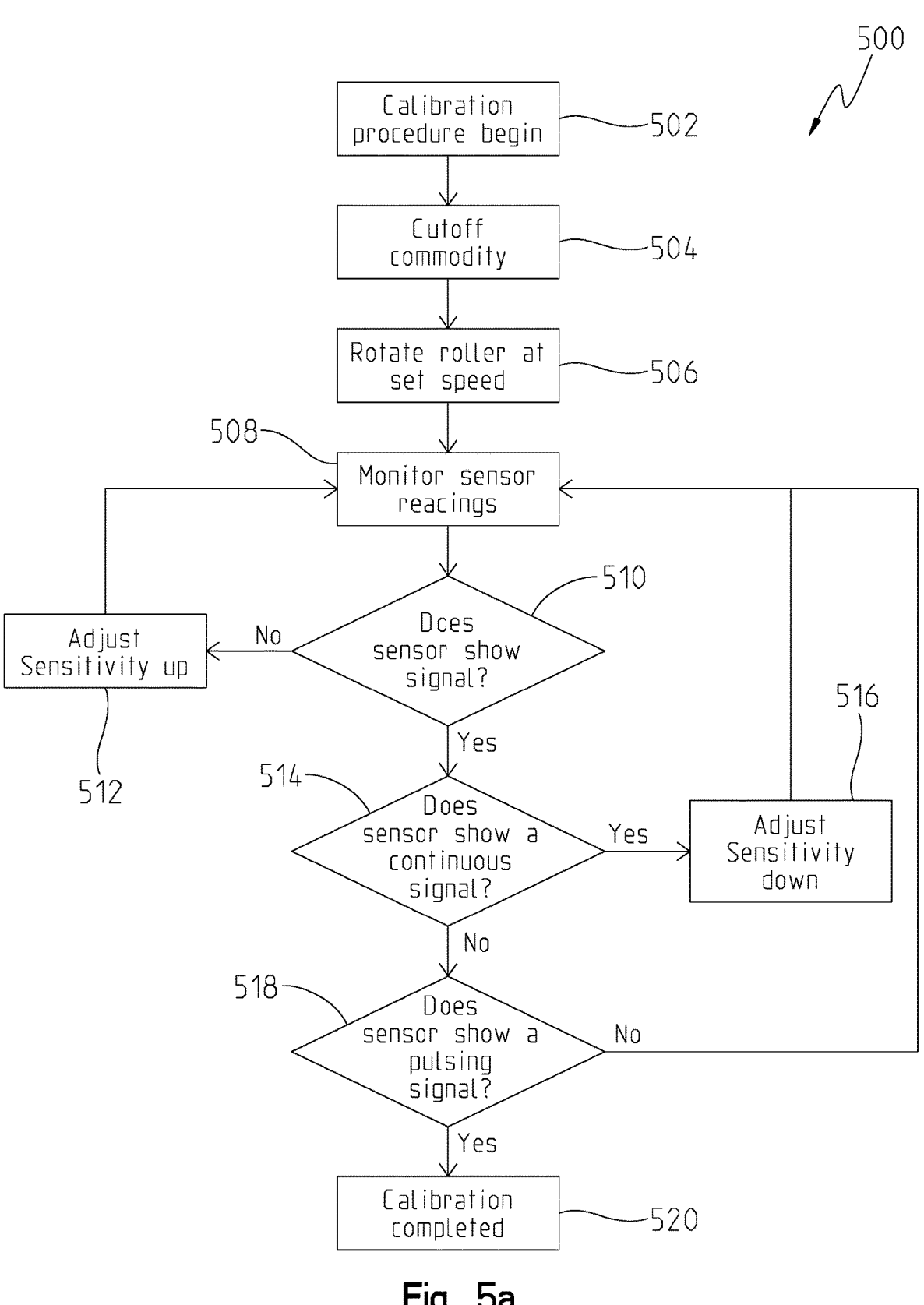
FIG. 5a is a logic flowchart for a calibration process.

Referring now to FIG. 5a, one non-exclusive example of a calibration process 500 is disclosed for the embodiment illustrated in FIG. 3. The calibration process 500 may begin in box 502 automatically if a calibration is needed or via an input from the user interface 228 or the like requesting the calibration process 500.

In one non-exclusive example, the controller 212 may utilize the table 501 of FIG. 5b to determine when to begin the calibration process 500. The table 501 illustrates the expected response of the sensors 304, 306 when commodity is not in the tank 202 (see column 503) and the roller 218 is engaged by the motor (see column 505). The first row 507 may represent the expected sensor readings when the sensors 304, 306 are properly calibrated. More specifically, both sensors 304, 306 may be showing a pulsing signal as the empty cavities 604 pass thereby. However, if either of the sensors are solid on or off while the tank 202 is empty and the motor is engaged (see rows 509, 511, 513, and 515), the controller 212 may identify that the sensors 304, 306 are miscalibrated (see column 517) and begin the calibration process of box 502.

Referring back to FIG. 5a, once the calibration process 500 begins in box 502 any commodity may be removed from the tank 202 in box 504 if the tank 202 is not already empty.

In one aspect of this disclosure, the controller 212 may automatically execute the calibration process 500 when the tank 202 is identified as empty with one or more of the tank fill height sensor 214 or the tank load sensor 216. Regardless, in box 504 any commodity in the tank 202 is either removed or otherwise cutoff from the roller 218.

Once the commodity is removed or isolated from the roller 218, the controller 212 may operate the roller at a set speed in box 506. The set speed may be any speed that allows the controller 212 to execute the remaining boxes of the calibration process 500. Accordingly, many different speeds may be appropriate for the roller 218 in box 506. In box 508, the controller 212 may monitor the sensor 304, 306 readings. As the controller 212 monitors the sensor readings, the controller 212 may determine whether the sensor 304, 306 is identifying any signal to the controller 212 in box 510. If the sensor 304, 306 is not identifying any signals in box 510, the controller 212 may increase the sensitivity in box 512 of the sensor 304, 306 that is not identifying a signal and re-executed box 508 and box 510.

If the controller 212 does identify a signal from the sensors 304, 306 in box 510, the controller 212 may check if the signal is continuous in box 514. If the signal of the sensor 304, 306 is continuous in box 514, the controller 212 may reduce the sensitivity of the corresponding sensor 304, 306 in box 516. After the sensitivity of the sensor is reduced in box 516, the controller 212 may re-execute boxes 508, 510, and 514 until the signal of the sensor 304, 306 is no longer continuous in box 514.

When the sensitivity of the sensors 304, 306 is adjusted as discussed with reference to the previous boxes, the controller 212 may check that the sensor's 304, 306 signal is pulsing in box 518. More specifically, in one aspect of the embodiment of FIG. 3, the sensors 304, 306 may be positioned along the roller 218 to determine whether commodity is in the cavities 604 of the roller 218. When no commodity is being supplied to the inlet 220 and the roller 218 is rotating, the sensors' 304, 306 signal should be pulsing as the cavities 604 of the roller 218 pass thereby. Accordingly, if the controller 212 identifies pulsing signals in box 518 it may determine that the calibration process is complete and execute box 520. However, if the controller 212 does not identify pulsing signals in box 518, the controller 212 may return to box 508 and modify the sensors 304, 306 accordingly.

The controller 212 may implement the calibration process 500 to simultaneously calibrate both sensors 304, 306 or may calibrate only one of the sensors 304, 306 at a time utilizing the teachings discussed herein. Accordingly, while this disclosure describes both sensor 304, 306 at the same time with reference to the calibration process 500, the calibration process may also be implemented for only one of the sensors 304, 306 at a time.

Further, the adjusting the sensitivity boxes 512, 516 may adjust the sensitivity using any adjustment increment reasonable for the sensor 304, 306. More specifically, the controller 212 may continue to monitor the sensors 304, 306 as it incrementally adjusts the sensitivity of the sensor 304, 306 until the desired conditions are met (i.e. a signal is identified in box 510 and the signal is not continuous in box 514). The incremental adjustment value may be preset and communicated to, or stored in, the controller 212 or it may be a user-selectable option via the user interface 228.

FIG. 5c illustrates one exemplary embodiment of a lookup table that may be referenced by the controller 212 as part of the logic implemented with the embodiment of FIG. 3. More specifically, the lookup table of FIG. 5c may have a first column 519 identifying the reading from the inlet sensor 304, a second column 521 identifying the reading of the outlet sensor 306, a third column 523 identifying the status of the motor powering the roller 218, a fourth column 525 identifying the status of the tank 202, a fifth column 527 identifying the condition of the meter assembly 300, and a sixth column 529 showing a response. Further, each row 531, 533, 535, 537, 539, 541, 543 may represent an exemplary scenario that may be present in the meter assembly. In the lookup table of FIG. 5c, it is assumed the sensors 304, 306 are properly calibrated as discussed herein.

Referring to row 531, a typical scenario is shown. In row 531, commodity is passing through the meter assembly 300 and therefore causes the inlet sensor 304 to give a solid reading in column 519, indicating commodity is passing thereby. Similarly, the outlet sensor 306 is pulsing as the empty cavities of the roller 218 pass thereby in column 521. The pulsing value of the outlet sensor 306 indicates that commodity is properly leaving the roller 218 and entering one or more of the passages 206, 208. The controller 212 may ensure the motor is engaged to rotate the roller 218 in column 523 and check one or more of the tank fill height sensor 214 and tank load sensor 216 to determine the status of the tank 202 in column 525. In the scenario of row 531, the condition of column 527 may be normal and the response of column 529 may be a green roller icon on the user interface 228 indicating the meter assembly 300 is functioning as expected.

Referring now to row 533 a scenario with a roller 218 rotation error is illustrated. In this scenario, the inlet sensor 304 may show commodity in the roller 218 in column 519. More specifically, in the scenario of row 522 commodity may remain in the cavities of the roller even if the roller 218 is not rotating. However, in column 521 the outlet roller 218 may be showing an off or otherwise not pulsing condition since the roller 218 is not rotating thereby. The controller 212 may check that the motor is engaged in column 523 and that the tank is not empty in column 525. In this scenario, the condition of column 527 may be a roller failure since the roller 218 is not rotating as expected. Accordingly, the response of column 529 may be a red roller icon illustrated on the user interface 228 to indicate the condition.

Row 535 may illustrate a scenario having a blockage of commodity in or below the outlet 222 of the meter assembly 300. In this scenario, both the inlet sensor 304 and the outlet sensor 306 may indicate a solid on condition in columns 519 and 521. In this scenario, commodity remains in the cavities of the roller 218 as it rotates due to the blockage at or below the outlet 222. Accordingly, both the inlet sensor 304 and the outlet sensor 306 identify commodity in the roller 218 which is indicative of a blockage at or below the outlet 222 as identified in the condition column 527. In this scenario the response of column 529 may be a red roller icon illustrated on the user interface 228 to indicate the condition.

Referring now to row 537, a scenario having an above-meter commodity bridge is illustrated. More specifically, both the inlet sensor 304 and the outlet sensor 306 may be pulsing in columns 519 and 521. The pulsing sensor readings indicates that commodity is not present in the roller 218 as it rotates. In this scenario, the controller 212 may ensure that the tank 202 is not empty in column 525 by checking one or more of the tank fill height sensor 214 and the tank load sensor 216. If the tank 202 is not empty but the roller 218 is not processing commodity, the controller 212 identifies the condition of column 527 to be an above-meter bridge or blockage of commodity. That is to say, the controller 212 identifies commodity is present in the tank 202 but not entering the inlet 220. In this scenario, the response of column 529 may include altering the parameters of the agitator 210 as explained with reference to FIG. 4b for example. Additionally, or instead of altering the parameters of the agitator 210, the controller 212 may identify the condition on the user interface 228 to allow the user to manually dislodge the bridge.

In the scenarios of rows 539 and 541, the motor powering the roller 218 may be off and therefore the roller 218 may not be rotating. However, in this scenario one of the inlet sensor 304 or outlet sensor 306 may be providing an intermittent reading. This may be indicative of a roller blow-by condition of the roller in column 527. A roller blow-by condition may occur when flutes of the roller do not extend entirely to the meter housing and a gap is defined between the end of the roller flute and the adjacent roller housing. In this configuration, a roller blow-by may occur when some commodity flows past the roller even when the roller is not rotating. Accordingly, the response of column 529 may be to display an orange icon of a roller on the user interface 228 indicating the roller blow-by condition.

The scenario of row 543 may be when the tank 202 is empty. In this scenario, both the inlet sensor 304 and the outlet sensor 306 may be showing a pulsing signal in columns 519 and 521. The pulsing signal is indicative of the roller 218 rotating without processing any commodity there through. The controller 212 may utilize one or more of the tank fill height sensor 214 and the tank load sensor 216 to ensure the tank 202 is empty and that an above-meter bridge of row 537 is not occurring. If the tank 202 is identified as empty, the controller 212 may indicate a tank warning or the like utilizing the user interface 228 as part of the response from column 529.

The responses discussed herein with reference to column 529 are only some examples of potential responses and other responses are also considered. More specifically, while displaying icons on the user interface 228 is discussed herein, other responses may include sending auditory indications such as beeps or the like. Further still, haptic feedback may communicate the condition to the user as part of the response. In yet another embodiment, a simple warning light or the like may illuminate as part of the response. In embodiments where one or more of the sensors are cameras, a photo or video clip may be displayed on the user interface 228 as part of the response. Accordingly, any response that can communicate the condition is considered herein and the specific responses discussed are meant as non-exclusive examples.

Figure 6:
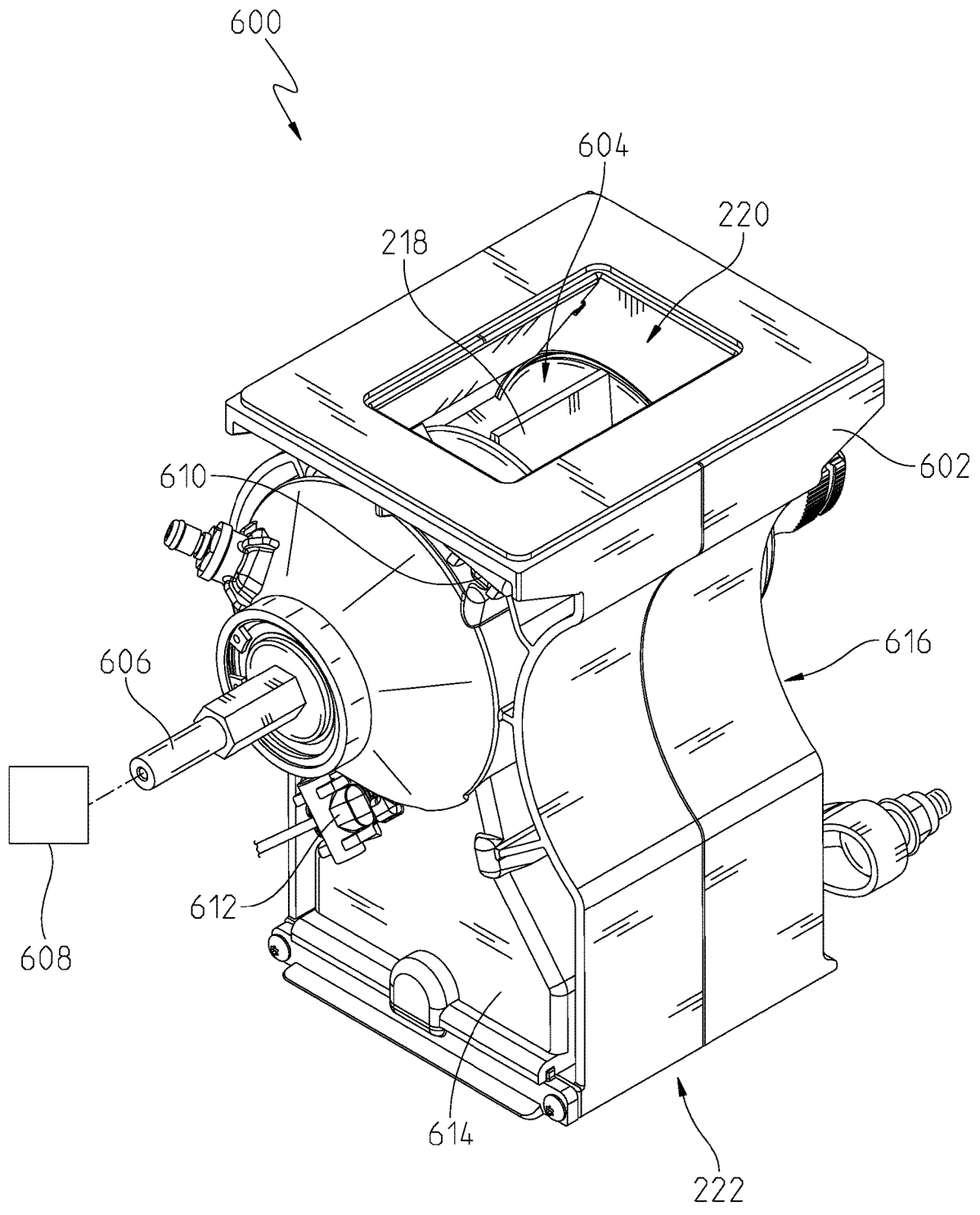
FIG. 6 is an elevated perspective view of a meter assembly.

Referring now to FIG. 6, one embodiment of a meter assembly 600 is illustrated separated from the tank 202, passages 206, 208, and other portions of the seeder 20. The meter assembly 600 may have an inlet 220, an outlet 222, and a roller 218 positioned there between as discussed herein. The cavities 604 of the roller 218 discussed herein may be more apparent with reference to FIG. 6. The meter assembly 600 may generally be formed of a meter housing 602. The meter housing 602 may be a molded material, such as plastic, and formed from two separate sections coupled to one another. The meter housing 602 may provide a passageway for commodity between the inlet 220 and the outlet 222 that is metered by the rotation of the roller 218.

The roller 218 may have a roller shaft 606 that extends through an orifice of the meter housing 602 and is coupled to a roller motor 608. The roller motor 608 may be an electrical, hydraulic, or pneumatic motor that selectively rotates the roller 218. As discussed herein, the rotation speed and direction of the roller 218 may be determined by the speed and direction with which the roller motor 608 rotates. Further, the controller 212 may selectively control the speed and direction of the roller motor 608.

The meter housing 602 may have a first cavity defined therein to receive an inlet sensor 610 and a second cavity defined therein to receive an outlet sensor 612. In one embodiment of this disclosure, the inlet sensor 610 may function in substantially the same manner as the inlet sensor 220 of FIG. 2. Similarly, the outlet sensor 612 may function in substantially the same manner as the outlet sensor 224 of FIG. 2. In one aspect of this disclosure, the first and second cavities are located to position the corresponding sensors 610, 612 in close proximity to commodity flowing through the meter assembly 600 without directly exposing the sensors 610, 612 to the commodity. In other words, at least a portion of the meter housing 602 may remain between the sensors 610, 612 and the commodity as it moves there through.

Figure 7:
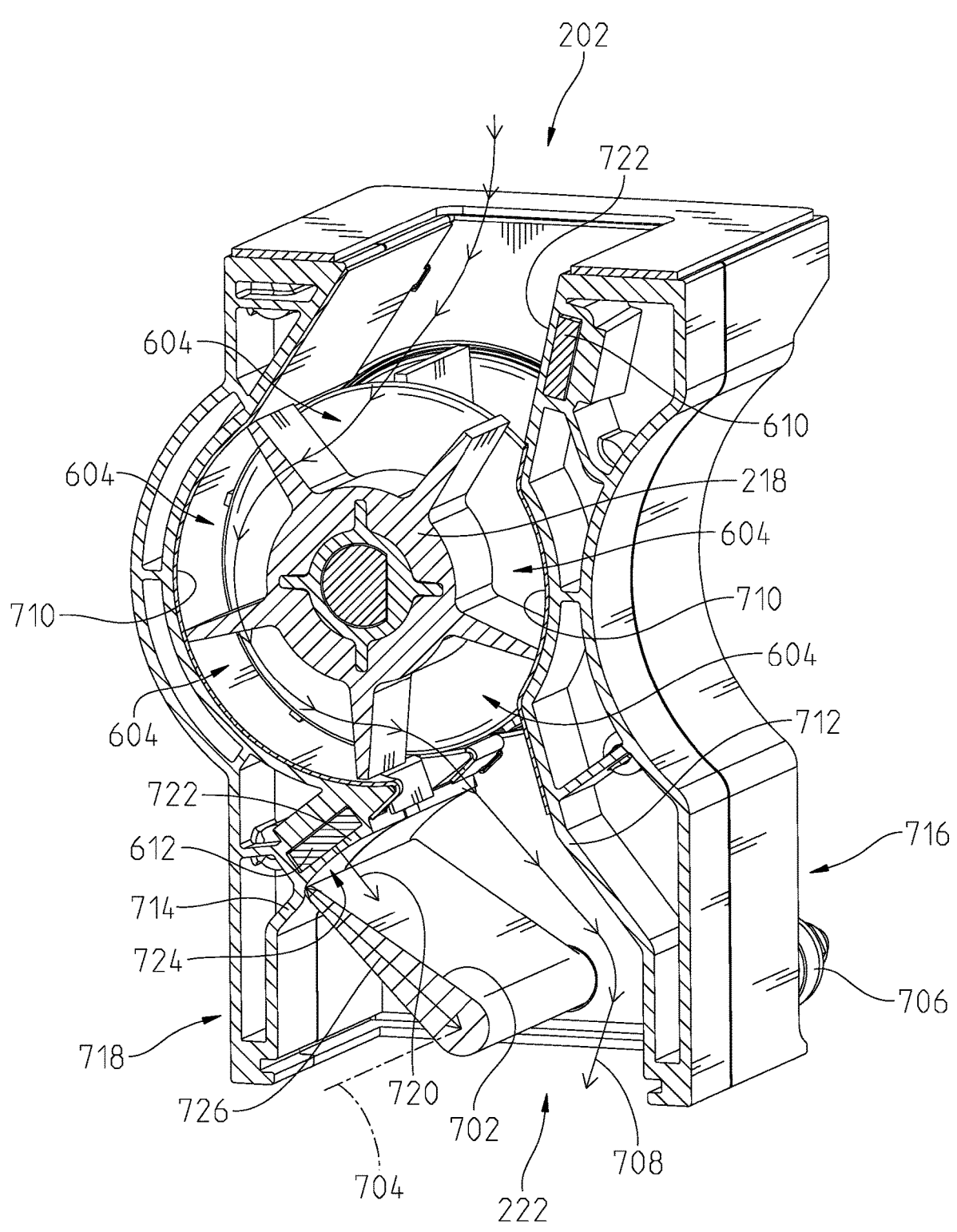
FIG. 7 is an elevated perspective section view of the meter assembly of FIG. 6.
Figure 8A:
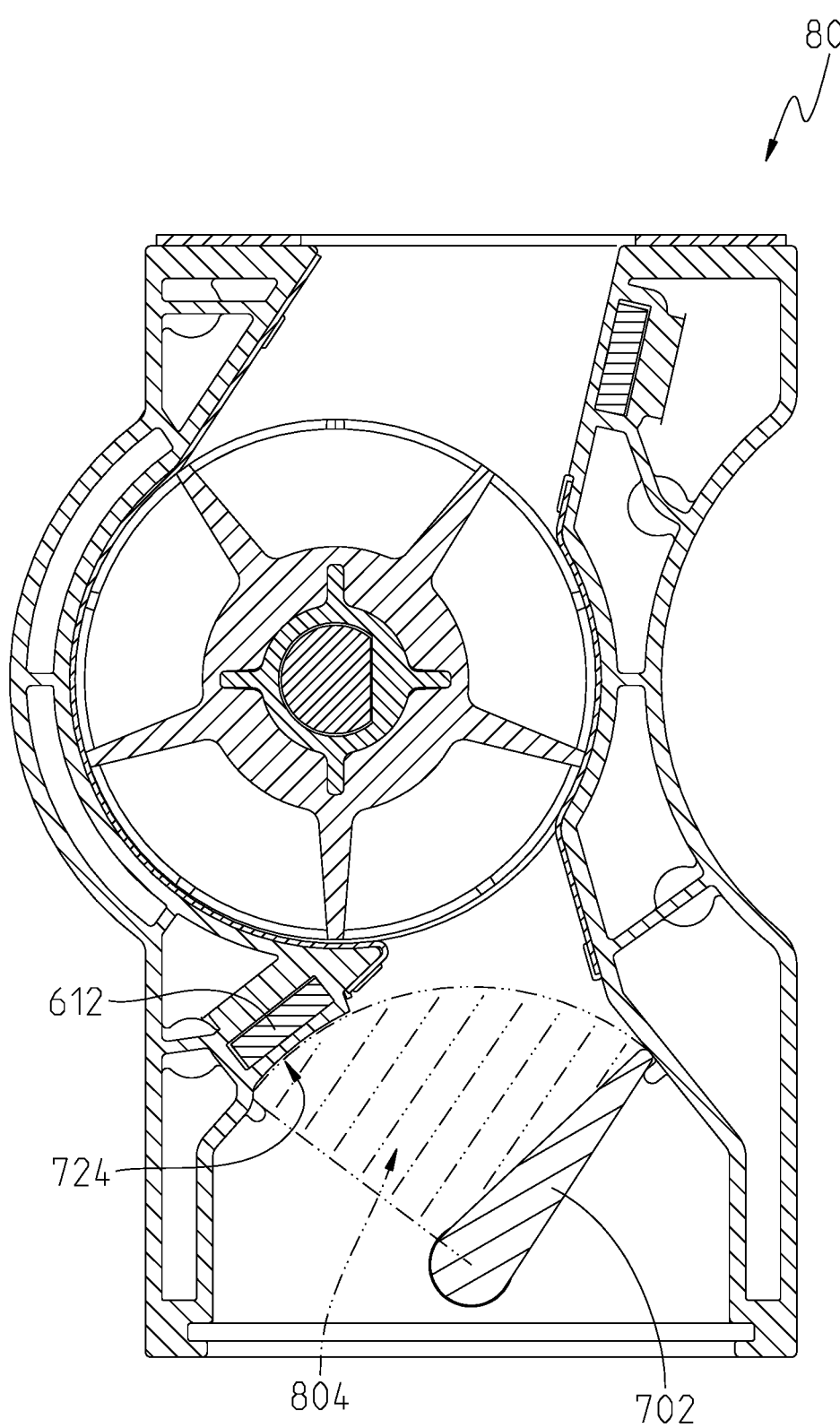
FIG. 8a is a side section view of the meter assembly of FIG. 6 in a first position.
Figure 8B:
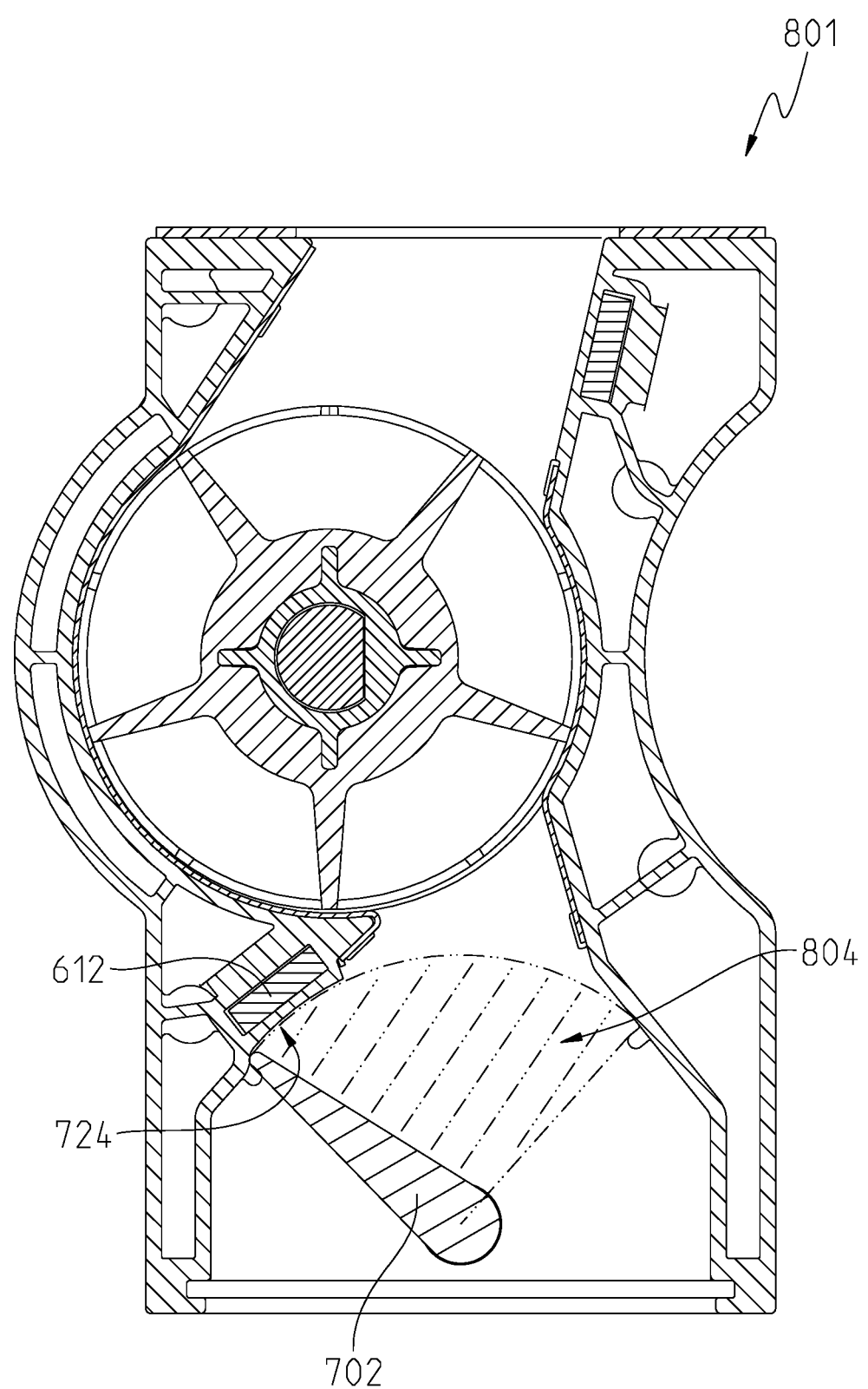
FIG. 8b is a side section view of the meter assembly of FIG. 6 in a second position.

Referring now to FIG. 7, a partial section view of the meter 600 is illustrated. More specifically, a flapper 702 is illustrated in FIG. 7. The flapper 702 is pivotally coupled to the meter housing 602, either directly or through a manifold coupled to the meter housing 602, to pivot about a flapper axis 704 between a first position 800 (see FIG. 8a) and a second position 801 (see FIG. 8b). The position of the flapper 702 may be selectively controlled by a flapper arm 706. More specifically, the flapper arm 706 may be coupled to an actuator or the like to selectively pivot the flapper between the first position 800 and the second position 801. Further, the controller 612 may selectively alter the actuator of the flapper arm 706 to thereby move the flapper between the first and second positioned 800, 801.

While a flapper 702 is illustrated coupled to the meter housing 602 as discussed herein, this disclosure considers positioning the flapper 702 in a manifold coupled to the meter housing as well. In this configuration, the flapper 702 and corresponding components may be positioned in the manifold which can be selectively coupled to the meter housing 602. Further still, this disclosure also considers utilizing a turret type run selector. The turret style run selector may be a rotary run selector that alters the flow path of commodity as it rotates about a rotation axis. Accordingly, this disclosure contemplates utilizing different types of run selectors either coupled directly to the meter housing 602 or to a manifold coupled thereto.

A commodity flow path 708 is also illustrated in FIG. 7. The commodity flow path 708 may generally represent the intended flow of commodity provided at the inlet 220 when the roller motor 608 is rotating the roller 218 in a counterclockwise direction as viewed in FIG. 7. As discussed herein, the roller 218 has a plurality of cavities 604 that receive commodity at the inlet 220 and transfer the commodity to the outlet 222 as the roller 218 rotates.

In one aspect of this disclosure, wear plates 710 may be positioned between the roller 218 and the meter housing 602 along the radially outer portions of the roller 218. More specifically, as the roller 218 rotates, commodity positioned in the cavities 604 may experience forces radially away from the rotation axis of the roller 218. The wear plates 710 may be formed of a material that is less likely to wear due to this contact compared to the material of the meter housing 602. In one non-exclusive example, the wear plates 710 may be formed of a metallic material while the meter housing 602 is formed of a plastic or the like. However, many different materials for the wear plates 710 and meter housing are also considered herein.

As illustrated in FIG. 7, the meter assembly 600 may define the commodity flow path 708 generally between a first wall 712 and a second wall 714 defined by the meter housing 602. The first wall 712 may be the portion of the meter housing 602 exposed to commodity on a first side 716 of the meter assembly 600 while the second wall 714 may be the portion of the meter housing 602 exposed to commodity on a second side 718 of the meter assembly 600. In one aspect of this disclosure, the commodity flow path 708 may be defined such that as commodity exits the cavities 604 of the roller 218, the commodity is generally directed towards the outlet 222 and the first wall 712. That is to say, as commodity exits the cavities 604 of the roller 218, the commodity is generally travelling at least partially away from the second wall 714.

In one aspect of this disclosure, the outlet sensor 612 is positioned along the second wall 714 to ensure a surplus commodity is only identified during a clogged condition. More specifically, the outlet sensor 612 may be positioned to have a primary reading direction 720 that is oriented to a portion of the outlet 222 that is not substantially exposed to the commodity flow path 708. In this configuration, the outlet sensor 612 will not falsely identify a blocked condition under high flow conditions because the commodity flow path 708 is generally directed away from the primary reading direction 720 of the outlet sensor 612. In other words, the outlet sensor 612 is not positioned in the first wall 712 because the commodity flow path 708 is directed toward the first wall 712 out of the roller 218 and positioning the outlet sensor 612 there along could cause false blockage readings during high commodity flow. However, in other embodiments the outlet sensor 612 is positioned along the first wall 712 instead of the second wall 714.

In another aspect of this disclosure, the outlet sensor 612 may be positioned along a portion of the second wall 714 so the primary reading direction 720 is not covered by one of the wear plates 710. As discussed herein, the wear plates 710 may be formed of a more wear resistant material compared to the meter housing 602. Accordingly, by positioning the outlet sensor 612 so the primary reading direction 720 is not through the wear plate 710, the resolution with which the outlet sensor 612 can identify commodity is increased. Similarly, the inlet sensor 610 may be positioned along a portion of the inlet 220 that is not covered by the wear plate 710.

In another aspect of this disclosure the inlet and outlet sensors 610, 612 may be separated from the commodity flow path 708 by meter material 722. In this orientation, the sensor 610, 612 may identify the presence of commodity in the commodity flow path 708 through the meter material 722 to thereby protect the sensors 610, 612 from direct contact with the commodity. That is to say, the sensors 610, 612 may be substantially protected from damage caused by the commodity because the meter material 722 separates the sensors 610, 612 from the commodity.

In another aspect of this disclosure, the meter material 722 separating the outlet sensor 612 from the commodity flow path 708 may have an arc-shaped surface 724 facing the commodity flow path 708. More specifically, the arc-shaped surface 724 may be defined about an arc that is coaxial with the flapper axis 704. Further still, the arc-shaped surface 724 may be spaced from the flapper axis 704 a distance that is about the same as a flapper length 726. In this configuration, as the flapper 702 transitions between the first position 800 and the second position 801, a distal end of the flapper 702 passes along the arc-shaped surface 724. Further still, in one aspect of this disclosure the distal end of the flapper 702 may pass close enough to the arc-shaped surface 724 to clean at least some residue or debris positioned thereon to thereby reduce obstructions in the primary reading direction 720 to increase clarity of the outlet sensor 612 readings.

While the outlet sensor 612 is illustrated and described as positioned adjacent to the arc-shaped surface 724, other embodiments considered herein position the outlet sensor adjacent to any portion of the meter housing 602 along a flapper sweep cavity 804. More specifically, the flapper sweep cavity 804 may be defined in the meter housing 602 to allow the flapper 702 to transition between the first position 800 and the second position 802. In one aspect of this disclosure, a first and second sidewall 614, 616 may be located along the sides of the flapper sweep cavity 804. In this configuration, the outlet sensor 612 may be positioned adjacent to the first or second sidewall 614, 616 along the flapper sweep cavity 804 to thereby identify the presence of a blockage of commodity in the outlet 222. Further, positioning the outlet sensor 612 in a sidewall 614, 616 may still allow the flapper 702 to at least partially clean any debris therefrom as the flapper 702 transitions between the first and second position 800, 801.

Figure 9:
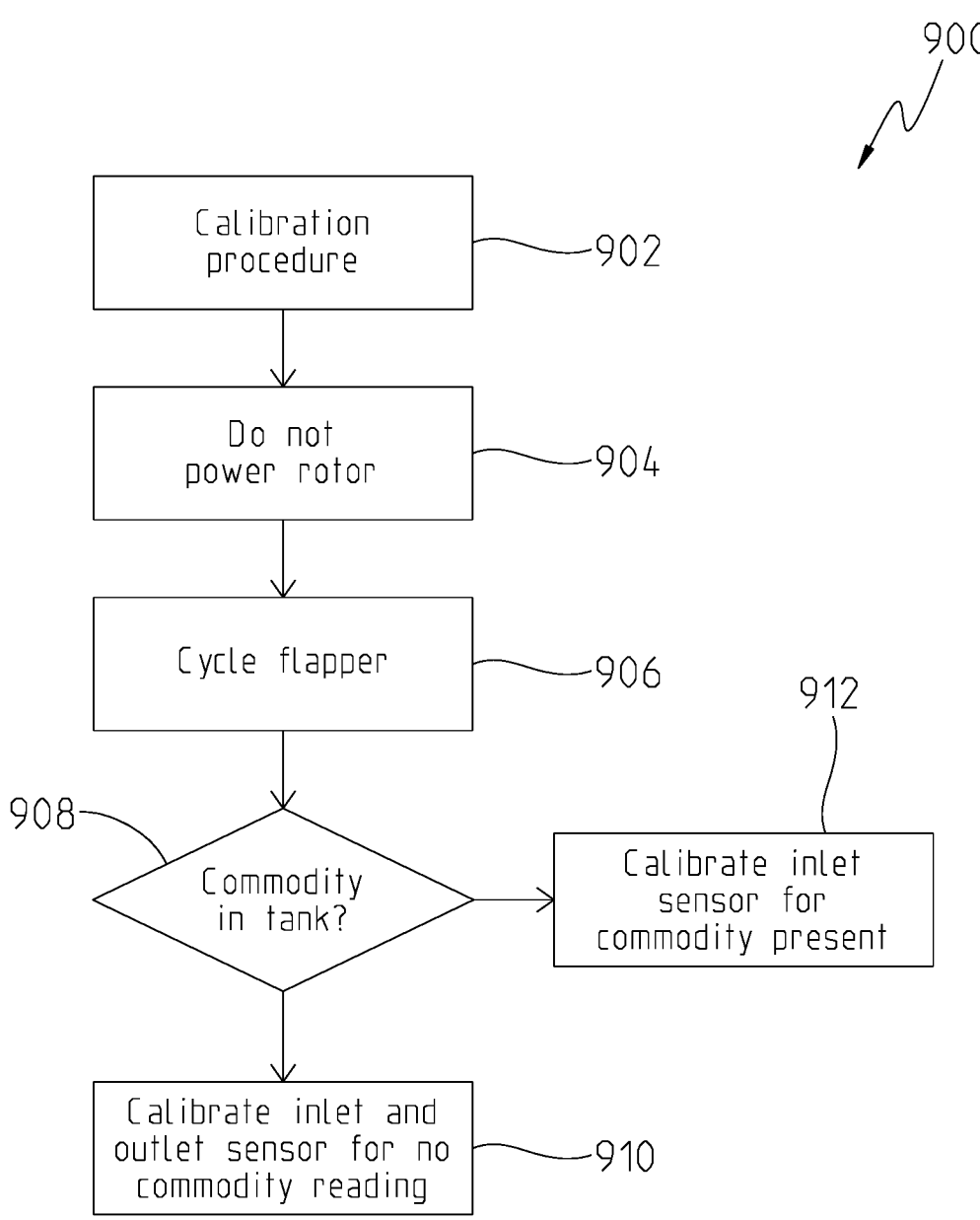
FIG. 9 is a logic flowchart for another embodiment of a calibration process.

Referring now to FIG. 9, another aspect of this disclosure includes a calibration process 900 for sensors 610, 612. The calibration process 900 may start with box 902 wherein the calibration process 900 is initiated as part of a routine calibration or because of a user-initiated calibration. The user-initiated calibration may be initiated by a selectable icon, button, switch, or the like on the user interface 228 or elsewhere that indicates the user intends to perform the calibration process 900. Alternatively, the calibration process 900 may automatically be executed by the controller 212 after a set amount of time between calibrations or automatically at the start of the tractor 22 or seeder 20. Further still, the calibration process 900 may be executed after a preset threshold of operating hours has passed. Further still, the calibration process 900 may be initiated if the outlet sensor 612 is giving faulty readings, indicating a potential debris buildup may be present. Accordingly, this disclosure contemplates initiating the calibration process 900 using many different methods.

Once the calibration process is initiated in box 902, in box 904 the controller 212 may ensure the roller 218 is not powered. The controller 212 may utilize any of the methods discussed herein to identify the state of the roller 218. In one aspect of this disclosure, the controller 212 may stop powering the roller 218 in box 904 to ensure any commodity in the tank 202 will be positioned along the inlet sensor 610 and not along the outlet sensor 612.

In box 906 the controller 212 may cycle the flapper 702 to wipe the arc-shaped surface 724 of any debris buildup that may be present. More specifically, cycling the flapper 702 in box 906 moves the flapper 702 over the arc-shaped surface 724 of the meter assembly 600 in order to remove any residual material buildup that may affect the outlet sensor 612 reading.

In box 908 the controller 212 may also check whether there is commodity in the tank 202. More specifically, one or more of the tank fill height sensor 214 and the tank load sensor 216 may be monitored in box 908 to ensure at least some commodity is in the tank 202. If commodity is not in the tank in box 908, the calibration process 900 may execute box 910 wherein both the inlet sensor 610 and the outlet sensor 612 are calibrated to a no-commodity reading. However, if commodity is in the tank 202 in box 908, the controller 212 may execute box 912 wherein the inlet sensor

610 is calibrated to a commodity present reading and the outlet sensor 612 is calibrated to a no-commodity reading.

The calibration process 900 may also be implemented when a different type of commodity is being processed through the meter. For example, when the commodity is a seed it may have a different density than when the commodity is a fertilizer. Further still, different types of seed and fertilizer may have different sensible properties relative to others. Accordingly, when the type of commodity is altered in the tank 202 the calibration process 900 may be executed to ensure the controller 212 can properly identify the presence of commodity in the meter assembly 600. Further still, in one aspect of this disclosure the user interface 228 may provide user selectable commodity types to be considered during the calibration process 900. More specifically, the controller 212 may compare the sensor readings to the expected sensor readings for the type of commodity and identify an error if the sensor reading values are not within an expected range for the commodity.

While a calibration process 900 is discussed herein, this disclosure also contemplates utilizing sensors and the like that do not require a calibration process at all. More specifically, in one aspect of this disclosure the sensors 610, 612 may be cameras and be able to identify the presence and type of commodity in the meter assembly 600 without requiring a calibration process. Further still, in other embodiments the type of commodity being processed by the meter may be input to the controller 212 via the user interface 228 or the like and the sensors 610, 612 may automatically be adjusted to calibrations associated with the particular type of commodity being processed. In this embodiment, the calibrations associated with the particular type of commodity may be predetermined and stored in a memory unit that the controller 212 accesses to implement the selected commodity calibration.

Figure 10:
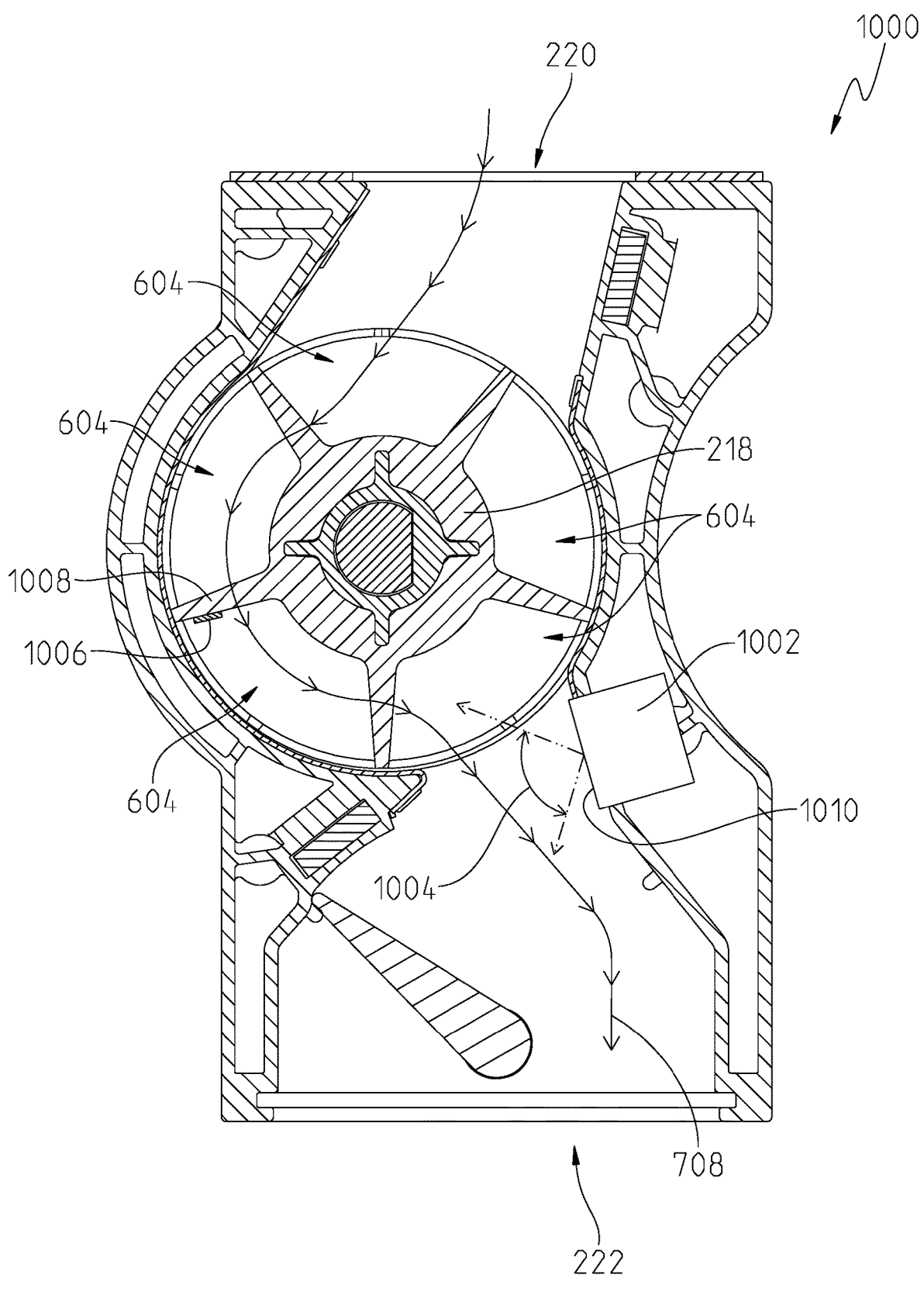
FIG. 10 is a side section view of another embodiment of a meter assembly.

Referring now to FIG. 10, another embodiment of a meter assembly 1000 is illustrated. This meter assembly 1000 may be substantially similar to the meter assembly 600 of FIGS. 6-8*b* except a camera 10002 is illustrated positioned in the meter assembly 1000. The camera 1002 may communicate with the controller 212 to achieve any of the advantages discussed herein for sensor 224. More specifically, the camera 1002 may be oriented in the meter assembly 1000 to view the commodity flow path 708. The camera 1002 may be positioned behind a substantially clear lens 1010 that blocks debris from contacting the camera 1002 and allows the camera 1002 to provide a visual perspective of the commodity and roller characteristics in the meter assembly 1000. The camera 1002 may communicate with the controller 212 to identify flow characteristics of the commodity along the flow path 708 to identify blockages as discussed herein.

In one aspect of this disclosure, the camera 1002 is oriented to provide a viewing angle 1004 that provides a view of both the flow path 708 and at least a partial view of the roller 218. Orienting the camera 1002 as illustrated in FIG. 10 and providing the exemplary viewing angle 1004 may allow the camera 1002 to provide image data to the controller showing both the flow characteristics of the commodity along the flow path 708 and roller characteristics of the roller 218. The roller characteristics may include the type of roller 218, any visual wear of the roller 218, and rotation speed of the roller 218 among other things. For example, the camera 1002 may be able to identify a specific color of the roller 218 and different colors of rotors may be associated with different configurations of roller 218 (i.e. different cavity size and spacing among other things).

In one embodiment of this disclosure, the roller 218 may have a visual indicator 1006 on a divider 1008 of the roller 218. The visual indicator may be a different colored divider 1008 or a mark on the surface of the divider 1008 that is visible to the camera 1002 as the divider 1008 passes thereby. The controller 212 may view the roller 218 via the camera 1002 and identify when the indicator passes thereby. The controller 212 may then determine the rotation speed of the roller 218 based on the number of times the indicator 1006 passes by the camera 1002.

While a specific orientation of the camera 1002 is illustrated and described herein, other orientations are also considered as part of this disclosure. More specifically, the camera may be positioned in any orientation in the meter assembly 1000 that allows the camera 1002 to view commodity flowing there through. While one embodiment may orient the camera 1002 to at least partially view the roller 218, other embodiments only orient the camera 1002 to view commodity flow out of the meter assembly 1000.

Figure 11:
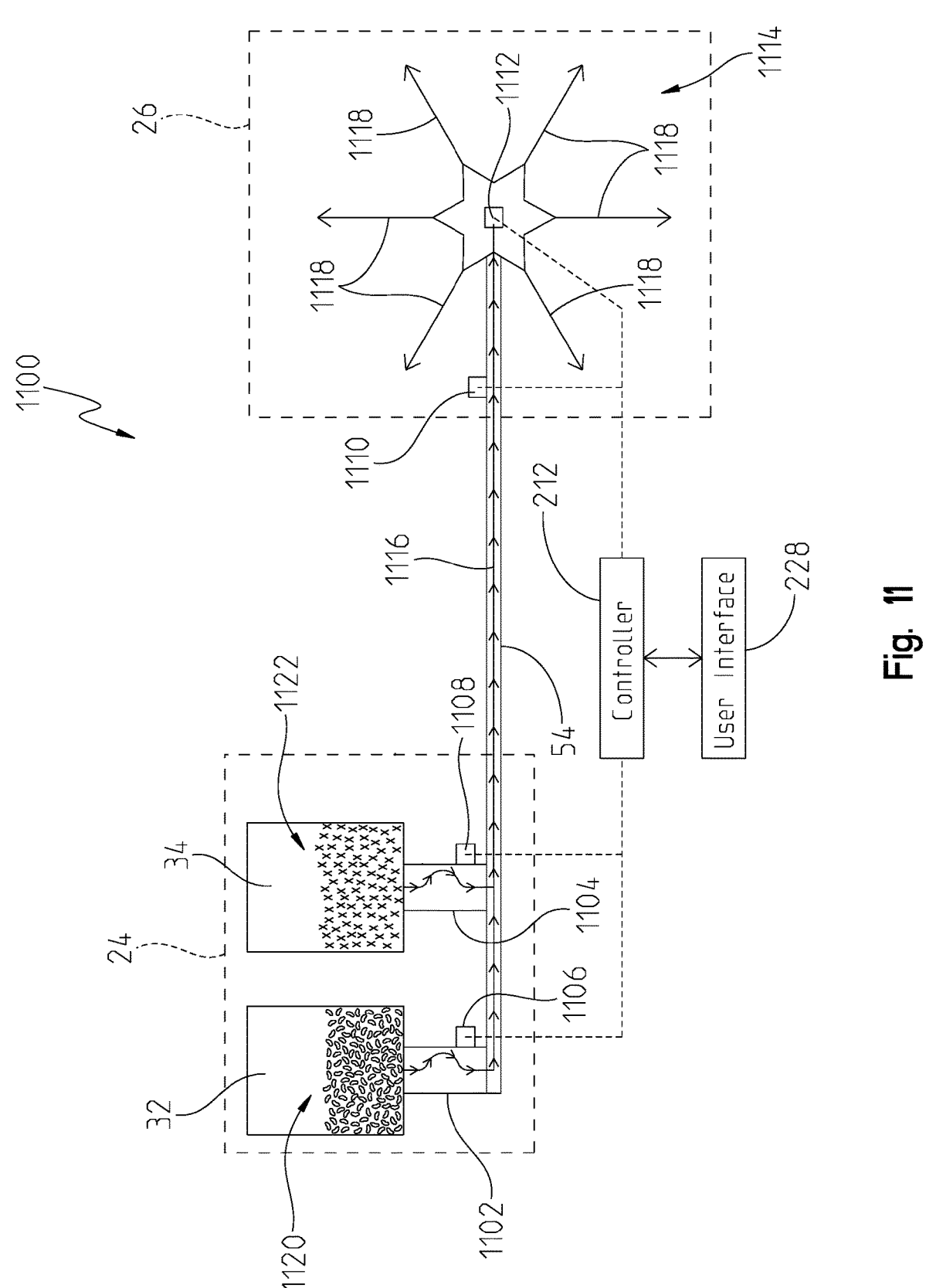
FIG. 11 is a schematic representation of one embodiment of a camera-based detection system.

Referring now to FIG. 11, a schematic representation of a camera-based detection system 1100 is illustrated. The camera based system 1100 may have a cart 24 that has tanks 32, 34 therein. The cart 24 may have more or less tanks as discussed herein with reference to FIG. 1, however, only two tanks 32, 34 are illustrated for the example schematic representation of FIG. 11. Each tank may have a meter assembly 1102, 1104 that substantially implements the teachings discussed herein. For example, each meter assembly 1102, 1104 may have a corresponding camera 1106, 1108 positioned along an outlet of the corresponding meter assembly 1102, 1104. Each camera 1106, 1108 may be positioned to provide visual feedback to the controller 212 regarding commodity flow from the corresponding meter assembly 1102, 1104 to the flow passage 54.

In one embodiment, a camera 1110 may be positioned along the flow passage 54 to identify commodity flow there through. In this configuration, the commodity flowing through the flow passage 54 may be a mixture of a first commodity in tank 32 and a second commodity in tank 34. The camera 1110 may communicate with the controller 212 to identify flow characteristics of the commodity such as the mixture of commodity, type of commodity, quality of the commodity, flow speed of commodity, coefficient of variation of individual commodities, and flow rate of the commodity among other things. In one aspect of this disclosure, the camera 1110 may provide visual data to the controller 212 that is further processed by the controller 212 to identify the flow characteristics of the commodity in the flow passage 54.

In yet another embodiment, a camera 1112 may be positioned at a secondary splitter 1114. The secondary splitter 1114 may be a portion of the flow path 1116 that commodity from a single flow passage 54 is divided into two or more runs 1118. The secondary splitter 1114 and runs 1118 of FIG. 11 may be substantially the same as the distributing manifold 60 and the secondary distribution lines 62 of FIG. 1. Accordingly, the secondary splitter 1114 divides the flow of commodity into a number of secondary runs 1118. Each run 1118 delivers commodity to one of a plurality of ground engaging tools 28 which opens a furrow in the soil and deposits the commodity therein. The number of passages 54 may vary from one to eight, nine, or ten or more, depending on the configuration of the cart 24 and drill 26. Depending on the cart and drill, there may be two secondary splitters in the air stream between the meters and the ground engaging tools.

Positioning the camera 1112 at the secondary splitter 1114 may allow the camera 1112 to provide image data to the controller 212 that can be analyzed to determine which runs 1118 are receiving commodity. More specifically, the camera 1112 may be positioned along a portion of the secondary splitter 1114 that allows the camera 1112 to provide image data at an inlet of each of the runs 1118. Accordingly, the image data can be analyzed to identify how much commodity and what type of commodity is entering each run 1118.

In one example of this embodiment, image data from the camera 1112 may help to identify a clog in a run 1118. More specifically, if a run 1118 is clogged commodity may not be entering that particular run 1118 from the secondary splitter 1114. Since the camera 1112 is positioned to view the inlet of each run 1118, the image data provided to the controller 212 from the camera 1112 may be analyzed to identify that commodity is not entering the inlet of the clogged run 1118.

In another aspect of this disclosure, the controller 212 may utilize image data provided by one or more of the cameras 1110, 1112 to identify the type of commodity mixture entering the runs 1118. For example, tank 32 may have a first commodity 1120 (i.e. seed) therein and tank 34 may have a second commodity 1122 (i.e. fertilizer) therein. Both the first and second commodity 1120, 1122 may be introduced into the flow path 1116 of the passage 54. Accordingly, a mixture of the first and second commodity 1120, 1122 may be in the flow path 1116 of the passage 54 as the commodity passes one or both of the camera 1110 and 1112. In this configuration, the controller 212 may analyze the image data provided by one or both cameras 1110, 1112 to identify the type of commodity flowing thereby. In the example presented herein, the controller 212 may identify that both the first commodity 1120 seed and the second commodity 1122 fertilizer are passing through the flow path 1116 of the passage 54 and being directed towards the corresponding runs 1118.

The quality of the commodity may be analyzed by any of the cameras 1106, 1108, 1110, 1112 discussed herein as well. To identify the quality of the commodity, the controller 212 may analyze the image data provided by the corresponding camera to ensure that the commodity appears as expected. For example, the commodity may be damaged and splintered or frayed and the image data provided by the cameras may allow the controller 212 to identify the damaged commodity.

Figure 12:
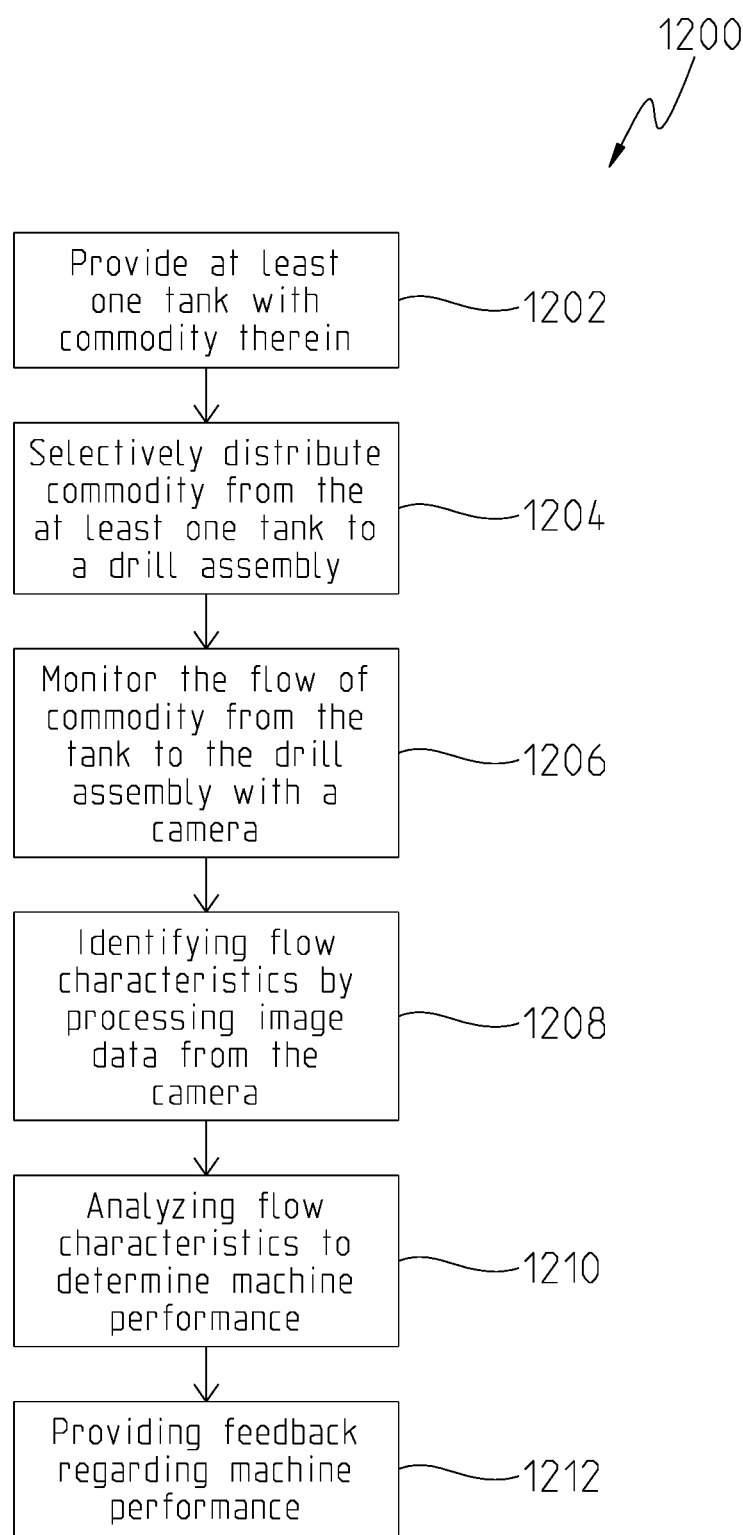
FIG. 12 is a flow chart for one method implementing the camera-based detection system of FIG. 11.

Referring now to FIG. 12, one method 1200 of the present disclosure is illustrated. This method 1200 may implement the components of the camera based system 1100 and others discussed herein. In box 1202, the method 1200 includes providing at least one tank having a commodity therein. As discussed herein with reference to FIG. 11, the tank may be tank 32 and the commodity may be the first commodity 1120. As part of box 1202, additional tanks and commodities may also be provided as part of this method. More specifically, tank 34 and the second commodity 1122 may also be provided at this point.

In box 1204, the commodity may be selectively distributed from the at least one tank to a drill assembly. This may be done utilizing any of the methods and components discussed herein. From the example of FIG. 11, meter assemblies 1102, 1104 may be positioned between tanks 32, 34 and the drill assembly 26 to selectively distribute commodity into the flow path 1116 to flow to corresponding runs 1118.

In box 1206, the controller 212 may monitor the image data provided from one or more of the cameras 1106, 1108, 1110, 1112. Many different camera configurations are considered part of this disclosure. For example, a camera may only be positioned at the outlet of the meter assembly as illustrated by 1002 of FIG. 10 and 1106, 1108 of FIG. 11. Alternatively, a camera 1110 may be positioned along the passage 54 and be able to provide image data to identify mixtures of commodity flowing there through. In another example, the camera 1112 is positioned at the secondary splitter 1114 and able to identify mixtures of commodity in the passage 54 and verify which runs 1118 are receiving commodity. Any combination of the camera configurations disclosed herein are also considered as part of this disclosure. In one example, a camera may be positioned at each location discussed in this disclosure to provide image data that is analyzed, compared, and verified against image data from other cameras.

With the camera at the meter assembly outlet, the controller 212 may be able to identify the performance of each meter assembly having a camera at the outlet. As disclosed herein, this image data may be sufficient to allow the controller 212 to determine roller characteristics such as roller type and roller speed among others, and commodity characteristics as the commodity leaves the roller. Commodity characteristics may include flow consistency, commodity type, commodity quality, blockage, and any other characteristic that may be identifiable via image data at the meter outlet. A camera at the meter assembly may provide image data of the commodity before it enters the passage 54. In this scenario, image data of the commodity is generated before any mixing of commodity has occurred.

In the example of camera 1110, image data can be produced from the passage 54 to show mixtures of commodity flowing there through. In this configuration, when two or more tanks are both providing a different type of commodity into the passage, the camera 1110 is positioned to identify the mixture in the passage 54. In one non-exclusive example, this camera 1110 may be positioned along the passage at a location just before the passage 54 enters the secondary splitter 1114. As one non-exclusive example, the camera 1110 may be positioned right before the J-shaped tube 66.

In the example of the camera 1112 at the secondary splitter 1114, the camera is positioned to monitor the commodity flowing through the passage 54 and into the runs 1118.

In box 1208, the image data from any one or more of the cameras discussed herein may be processed by the controller 212 to identify the flow characteristics of the commodity. The flow characteristics may include any one or more of the commodity type, mixture ratio, quality, and flow rate among other things. Once the flow characteristics are identified, the controller may analyze the flow characteristics to determine machine performance in box 1210. For example, the cameras 1002, 1106, 1108 may be analyzed to identify a blockage at the meter assembly outlet, the type of commodity being distributed through each meter assembly, the quality of the commodity flowing there through, the roller rotation speed, roller wear, and any other characteristic identifiable through image data orientated as described herein.

The flow characteristics of the camera 1110 may also be analyzed in box 1210. The image data from camera 1110 may be analyzed by the controller 212 to identify flow characteristics such as a blockage in the passage 54, the types of commodity being distributed through the passage, the mixture ratio of the commodity flowing through the passage, the quality of the commodity flowing there through, and any other characteristic identifiable through image data orientated as described herein.

The flow characteristics of the camera 1112 may also be analyzed in box 1210. The image data from camera 1112 may be analyzed by the controller 212 to identify flow characteristics such as a blockage in the passage 54, the types of commodity being distributed through the secondary splitter 1114 and into the runs 1118, the mixture ratio of the commodity flowing through the secondary splitter 1114 into the runs 1118, the quality of the commodity flowing there through, which runs 1118 are receiving commodity and which runs 1118 may be clogged, and any other characteristic identifiable through image data orientated as described herein.

Lastly, in box 1212 feedback may be presented via the user interface 228 or other means presenting the results of the analyzed flow characteristics. In one non-exclusive example, the results of the analyzed flow characteristics may be displayed on the user interface 228 to indicate if a blockage was identified, the quality of the commodity, the commodity mixture, whether a run is blocked, and meter roller performance among other things. The user interface 228 may have icons that correspond with the analyzed flow characteristics to show the user how the machine is performing. Further still, the user interface 228 may show the image data to the user of any abnormal conditions. For example, of a blockage is identified in a camera of a meter housing, the image data from that camera may be displayed on the user interface.

The analyzed image data may also be incorporated into meter flow logic 400 discussed herein. More specifically, image data from a meter camera such as 1002, 1106, 1108 may be utilized to execute at least boxes 422, 426, 430. At least data for columns 444 and 446 may be provided by analyzing image data from cameras 1002, 1106, 1108 as discussed herein. Further, the image data from camera 1112 at the secondary splitter 1114 can be analyzed to identify blockages at the tool for box 431 and an under meter blockage 432. Similarly, a commodity buildup identified in camera 1110 at the passage 54 would be indicative of a blockage at tool 431 and an under meter blockage 432. Accordingly, this disclosure contemplates using the analyzed image data from any of the cameras discussed herein to aid in implementing the logic systems of this disclosure.

In one aspect of this disclosure, any of the cameras discussed herein may implement a global shutter capable of providing precise image data to the controller 212 to be analyzed. However, any known camera system able to provide adequate image data to be analyzed by the controller 212 is considered as well.

While an air seeder is specifically referred to herein, this disclosure contemplates using the disclosed camera and logic for any system that disperses commodity through a passage. Accordingly, this disclosure also considers utilizing the camera sensors and logic discussed herein for fertilizer application and the like.

While the disclosure has been illustrated and described in detail in the drawings and foregoing description, such illustration and description is to be considered as exemplary and not restrictive in character, it being understood that illustrative embodiment(s) have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

The invention claimed is:

1. A method for identifying a flow of commodity through a commodity distribution system, comprising:
   providing a tank configured to contain a commodity;
   selectively distributing commodity with a meter assembly from the tank to a drill assembly to be distributed to an underlying surface; and
   monitoring the flow of commodity from the tank to the drill assembly with a camera to identify flow characteristics while the commodity is being directed to the drill assembly;
   wherein the camera is positioned to identify a roller type of the meter assembly.

2. The method of claim 1, further wherein the identified flow characteristics comprise a commodity type.

3. The method of claim 1, further wherein the flow characteristics comprise identifying a blockage in commodity between the tank and the drill assembly.

4. The method of claim 1, further wherein the flow characteristics comprise a roller speed.

5. The method of claim 1, further wherein the camera is positioned to identify the flow of commodity after passing through the meter assembly and before a secondary splitter.

6. The method of claim 1, further wherein the camera is positioned at the meter assembly to identify the flow of commodity through the meter assembly.

7. The method of claim 1, further wherein the flow characteristics comprise identifying the commodity flow rate.

8. The method of claim 1, wherein the camera is oriented to provide a viewing angle that provides a view of both a flow path of the commodity and at least a partial view of a roller.

9. The method of claim 8, wherein the camera is configured to identify one or more of wear of the roller, rotation speed of the roller, or color of the roller.

10. An air seeding system, comprising:
    a tank configured to at least partially contain a commodity;
    a meter assembly configured to selectively distribute commodity from the tank to one or more run;
    a drill assembly configured to direct the commodity provided by the one or more run to an underlying surface;
    a camera positioned along a flow path between the meter assembly and the drill assembly at a location configured to monitor the flow of commodity from the meter assembly to the drill; and
    a controller in communication with the camera;
    wherein, the controller analyzes data provided by the camera to determine flow characteristics of commodity along the flow path;
    wherein the camera is positioned at a splitter and is configured to observe the flow of commodity into each of a plurality of secondary runs to determine which of the plurality of secondary runs are receiving commodity.

11. The air seeding system of claim 10, wherein the plurality of secondary runs comprises eight or more secondary runs extending from the splitter and the controller analyzes data provided from the camera to determine flow characteristics to each of the plurality of secondary runs.

12. The air seeding system of claim 10, wherein the controller analyzes the data provided by the camera to determine independent flow characteristics of commodity to each of the plurality of secondary runs.

13. The air seeding system of claim 12, wherein the controller analyzes data provided by the camera to determine a clog in any one of the plurality of secondary runs.

14. The air seeding system of claim 10, wherein each run of the plurality of secondary runs delivers commodity to one of a plurality of ground engaging tools.

15. The air seeding system of claim 10, wherein the camera is positioned at a location relative to the splitter to provide image data of an inlet of each of the plurality of secondary runs.

16. The air seeding system of claim 10, wherein the camera is configured to provide image data to identify an amount and type of commodity entering each of the plurality of secondary runs.

17. A method for identifying the flow of commodity through a system, comprising:

providing a fluid path between a tank and a drill;

positioning a camera to view material moving along the fluid path as the material is being directed from the tank to the drill;

communicating image data from the camera to a controller;

analyzing the data with the controller to identify the flow characteristics of commodity moving along the fluid path; and showing images of the image data on a user interface to be viewed by a user.

18. The method of claim 17, further comprising comparing the flow characteristics with a threshold to identify a blockage.

19. The method of claim 18, wherein the controller provides a warning when a blockage is identified.

20. The method of claim 17, wherein the controller is configured to identify a blockage and show a live image of the blockage on the user interface when the blockage is identified.

\* \* \* \* \*